(12) United States Patent
Reed

(10) Patent No.: US 10,457,491 B2
(45) Date of Patent: Oct. 29, 2019

(54) CONVEYING SYSTEMS AND METHODS OF USE

(71) Applicant: Lorin Reed, Kingsburg, CA (US)

(72) Inventor: Lorin Reed, Kingsburg, CA (US)

(*) Notice: Subject to any disclaimer, the term of this patent is extended or adjusted under 35 U.S.C. 154(b) by 0 days.

(21) Appl. No.: 16/181,229

(22) Filed: Nov. 5, 2018

(65) Prior Publication Data
US 2019/0071255 A1 Mar. 7, 2019

Related U.S. Application Data

(63) Continuation of application No. 15/632,402, filed on Jun. 26, 2017, now Pat. No. 10,118,769, which is a
(Continued)

(51) Int. Cl.
*B65G 39/08* (2006.01)
*B65G 13/11* (2006.01)
(Continued)

(52) U.S. Cl.
CPC ............ *B65G 39/08* (2013.01); *B65G 13/06* (2013.01); *B65G 13/073* (2013.01); *B65G 13/11* (2013.01); *B65G 19/24* (2013.01); *B65G 39/09* (2013.01)

(58) Field of Classification Search
CPC ........ B65G 13/06; B65G 13/11; B65G 39/08; B65G 13/073; B65G 47/82; B65G 19/24; B65G 54/00; B65G 54/02
See application file for complete search history.

(56) References Cited

U.S. PATENT DOCUMENTS

| | | |
|---|---|---|
| 3,782,515 A | 1/1974 | Cowen |
| 5,377,816 A | 1/1995 | Deligi et al. |

(Continued)

FOREIGN PATENT DOCUMENTS

| | | |
|---|---|---|
| CN | 202897467 | 4/2013 |
| EP | 0199045 | 10/1986 |

(Continued)

OTHER PUBLICATIONS

Liu Wenjun, Roller sweeping device of belt conveyor, English Abstract of Chinese Patent Publication CN202897467, Apr. 24, 2013, European Patent Organization, http://www.epo.org/searching/free/espacenet.html.
(Continued)

*Primary Examiner* — Mark A Deuble
(74) *Attorney, Agent, or Firm* — William K. Nelson; Mark D. Miller; Jared E. Christensen

(57) ABSTRACT

The present invention provides an improved conveyor system that provides for a magnetically driven conveyor system in which a sidewall of the conveyor may have minimal or no perforations therein for connecting rollers or other conveying structures in the conveyor bed to an external driving mechanism. The conveyor system may also provide gapless or nearly gapless roller bed that prevents or reduces the accumulation of debris and contaminants in and between the hardware of the conveyor bed. The system of the present invention may provide a more efficient and sanitary conveyor system for produce washing or other food processing application that requires less maintenance.

20 Claims, 20 Drawing Sheets

Related U.S. Application Data continuation of application No. 15/055,254, filed on Feb. 26, 2016, now Pat. No. 9,688,473.

(60) Provisional application No. 62/127,197, filed on Mar. 2, 2015.

(51) Int. Cl.
  *B65G 13/06* (2006.01)
  *B65G 19/24* (2006.01)
  *B65G 13/073* (2006.01)
  *B65G 39/09* (2006.01)

(56) References Cited

U.S. PATENT DOCUMENTS

| | | | |
|---|---|---|---|
| 5,899,320 A | 5/1999 | Miyasaka | |
| 6,244,427 B1 | 6/2001 | Syverson | |
| 6,286,659 B1 | 9/2001 | Petrovic | |
| 6,615,975 B2 | 9/2003 | Ranger et al. | |
| 6,710,505 B1 | 3/2004 | Barani et al. | |
| 6,854,592 B2 | 2/2005 | Fukuoka | |
| 6,959,804 B2 | 11/2005 | Helgerson et al. | |
| 7,134,258 B2 * | 11/2006 | Kalany | B65B 35/24 53/473 |
| 7,175,018 B2 | 2/2007 | Helgerson et al. | |
| 7,258,882 B2 | 8/2007 | Hankinson et al. | |
| 8,011,495 B2 * | 9/2011 | Anderson | B65G 47/088 198/419.2 |
| 8,102,095 B2 | 1/2012 | Hoffmann et al. | |
| 8,720,673 B2 * | 5/2014 | Loecht | B65G 19/02 198/619 |
| 8,727,101 B2 | 5/2014 | Chiarini et al. | |
| 8,757,364 B2 | 6/2014 | Obst | |
| 8,776,985 B2 * | 7/2014 | Huettner | B65G 54/02 198/459.8 |
| 9,067,735 B2 | 6/2015 | Kim | |
| 9,688,473 B2 | 6/2017 | Reed | |
| 2003/0198716 A1 | 10/2003 | Hankinson et al. | |
| 2004/0016626 A1 | 1/2004 | Helgerson et al. | |
| 2004/0035684 A1 | 2/2004 | Fukuoka | |
| 2006/0016668 A1 | 1/2006 | Helgerson et al. | |
| 2008/0032010 A1 | 2/2008 | Hankinson et al. | |
| 2008/0236998 A1 | 3/2008 | Shurko | |
| 2010/0084247 A1 * | 4/2010 | Wipf | B65G 19/02 198/617 |
| 2011/0005898 A1 * | 1/2011 | Pundsack | B65G 17/26 198/429 |
| 2011/0067975 A1 * | 3/2011 | Pazdernik | B65G 47/088 198/429 |
| 2012/0006648 A1 | 1/2012 | Obst | |
| 2013/0056332 A1 * | 3/2013 | Cavina | B65G 19/02 198/731 |
| 2014/0076692 A1 * | 3/2014 | van de Loecht | B65G 47/31 198/606 |
| 2014/0097066 A1 | 4/2014 | Kim | |
| 2014/0110227 A1 | 4/2014 | Ragan et al. | |
| 2014/0305773 A1 | 10/2014 | Agnoff | |
| 2015/0047295 A1 * | 2/2015 | van de Loecht | B65B 35/205 53/235 |

FOREIGN PATENT DOCUMENTS

| | | |
|---|---|---|
| EP | 1348488 | 10/2003 |
| EP | 1964794 | 9/2008 |
| GB | 2472020 | 1/2011 |
| WO | 1999000317 | 1/1999 |

OTHER PUBLICATIONS

Giardina, Gianni, Romano, Michele, Device for cleaning a conveyor belt for moving workpieces through a painting installation, English Abstract of European Patent Publication EP1348488A2, Oct. 1, 2003, European Patent Organization, http://www.epo.org/searching/free/espacenet.html.

* cited by examiner

CONVEYING SYSTEMS AND METHODS OF USE

This application claims the benefit of U.S. Provisional Patent Application No. 62/127,197 filed on Mar. 2, 2015, U.S. patent application Ser. No. 15/055,254 filed on Feb. 26, 2016, and U.S. patent application Ser. No. 15/632,402 filed on Jun. 26, 2017, each of which are incorporated herein by this reference in their entireties.

FIELD OF THE INVENTION

The present invention relates to novel conveyor systems, and more particularly to roller conveyor systems employing a magnetic rotor system for rotating the rollers while preventing contamination of the conveyor system, and methods of using the same.

DISCUSSION OF THE BACKGROUND

A wide variety of conveyor systems have been developed for use in transporting produce during harvest, cleaning, and packaging. Roller conveyors are commonly used in such applications. Roller conveyors may be used, for example, in produce washing tables, which may include a set of rollers having bristles thereon for contacting the fruit, a retaining wall along the lateral sides of the table to prevent the produce from falling off of the washing table, and a roller driving system that engages the rollers to cause them to convey the produce through the system.

Roller conveyors used to convey articles along a given pathway are generally comprised of plurality of spaced, parallel rollers positioned along and transverse to the pathway. A frame having parallel roller support sections typically supports the rollers. Each roller typically has a shaft or axle that is supported at its opposed ends by the frame support sections. A roller body is provided on each shaft to support the article being conveyed (e.g., produce). A typical conveyor frame includes a pair of spaced, parallel side rails each having a vertical wall with an inner face and an outer face. A plurality of openings are typically provided on each side rail to support the roller shafts, with the openings on one side rail mirroring the openings in the other side rail. The side rails may also be configured to further isolate the drive means from the rollers, e.g., with an upper wall extending outwardly from the upper edge of the vertical wall.

In conventional roller conveyor systems, shafts extend out from both ends of each roller. These shafts are typically supported by the openings in the side rails, and the roller shafts extend through openings in the side rails. The shafts on one side of these systems are simply allowed to idly rotate in place in the openings, while the shafts on the other side extend through the side rail openings where they are engaged to a driving motor through a transmission system.

Conventional roller conveyor systems for a produce washing tables and other systems typically utilize a sprocket system, in which each roller is connected to a sprocket through the retaining wall by a mechanical coupling assembly. It is to be appreciated that the openings in the side rails must be present in order to connect the rollers to the driving mechanism through the mechanical coupling assembly. Unfortunately, the gaps between the rollers and the retaining walls and the openings through the side rails allow the passage of water, cleaning solutions, wax, debris, and other materials. These contaminants may pass from the roller bed through the retaining wall and into the drive system, which may clog or damage the system, requiring cleaning and repair. Conversely, foreign materials may pass into the system and onto the rollers from the outside, potentially contaminating the fruit or other product being conveyed thereon.

Importantly, any gaps between the lateral ends of the rollers and the retaining walls of the conveyor, as well as the holes in the side rails, may act as a collection site for debris and bacteria, which can result in contamination of the produce on the washing table. In some systems, rubber seals or bearings may be provided in the shaft support side wall openings to prevent such contamination, but these may only serve to collect and accumulate undesirable contaminants from the conveyed products. Regular cleaning is therefore necessary to maintain a safe food processing environment and minimize the threat of contamination by harmful microbes such as safe and free of any contaminants such as *E. coli* and *Listeria*. Proper cleaning may be onerous and costly to the operator in terms of both labor and down time.

In particular, it is often necessary to disassemble these conveyor systems for effective and thorough cleaning. The disassembly process can be time-consuming and tedious because it may be necessary to disassemble the roller bed and the drive mechanism in order to sufficiently access the interior parts of the conveying system for sanitation and maintenance. The rollers may need to be removed from their mountings on the conveyor system in order to access the surfaces of the roller, the retaining wall and the coupling assembly, where debris may accumulate. Conveyor system drive mechanism components must be thoroughly cleaned on a regular basis to both maintain the conveyor system in proper working order and to prevent bacteria, foreign particulates or other contamination from coming in contact with the food products.

The time required to disassemble and clean and/or repair a conveyor system can result in a loss of production time while the conveyor system is inoperable and a corresponding loss of revenues. Additionally, the drive system and other components may be damaged over time by the continuous accumulation of materials from the roller bed. It is therefore desirable to provide a conveyor system that reduces the risk of debris accumulation in the mechanical system and prevents or reduces contamination of the system.

Unfortunately, experience has shown that even regular and thorough cleaning of produce conveyor systems is often not enough to eradicate *E. coli* and *Listeria* because these pathogens are capable of surviving in even the smallest and most remote areas. Because of the potential for contamination of produce on the rollers, and because of the potential for transmission of contaminants from the conveyor rollers to the drive mechanism and vice versa, it is desirable to minimize the number of places where such contaminants may be transmitted or accumulate.

It is therefore desirable to provide a novel conveyor system that addresses such issues.

SUMMARY OF THE INVENTION

The present invention relates to improved conveyor systems and more particularly to improved conveyor systems that utilize a magnetic rotor system that may prevent the passage of debris and contaminants out of the conveyor bed into other parts of the machine, including the driving system, and/or allows the gap between rollers and retaining walls (sidewalls) along the conveyor bed to be minimized, and methods of using the same. In some embodiments, the conveyor systems may be configured to handle produce at various stages of processing while minimizing the debris and contaminants collected by the conveyor bed components (e.g., brush rollers) and the collection of debris in and on the driving system of the conveyor. In this manner, damage and wear on the driving system of the conveyor may be prevented and the collection of bacteria, fungus, and other contaminants at the sidewalls of the roller bed may be minimized, thereby reducing the time and frequency of conveyor maintenance procedures.

Other embodiments of the present invention may be utilized for other industrial and manufacturing applications. For example, and without limitation, the roller conveyor systems of the present invention may be used for routing isolated loads (pallets, containers, boxes, cartons, etc.) in the areas of rail and air freight in-feed, automatic postal package sorting, hospital logistics, medical device and pharmaceutical manufacturing, transport and storage of documents and files, transfer of electronics on assembly line, routing of orders to a shipping point, sorting of cartons, weighing and labeling stations, food product packaging line (deep-frozen foods), handling of bags and containers, reception of pallets (docks), preparation of orders for mail order sales, and other industrial and manufacturing applications.

The conveyor systems of the present invention may include a conveyor bed in which the rollers are positioned, lateral sidewalls for preventing items from falling off of the conveyor bed, at least one driving system for driving a driving chain or belt connected to sprocket and bearing assemblies, magnetic driving rotors connected to the sprocket and bearing assemblies, and the rotation of the rollers fitted with passive magnetic rotors to magnetically engage the magnetic driving rotors through the sidewall. However, the present invention is not limited to this particular arrangement. For example, the magnetic driving rotors may be electromagnetic rotors that include one or more electromagnets that alternate their polarity to drive the rotation of the passive magnetic rotors on the opposite side of the sidewall. In further variations, each magnetic driving rotor may be engaged with a separate motor (e.g., an AC motor, etc.) driving the rotation of the magnetic rotor. Still further variations on the driving system of the present invention are within the scope of the present invention, and are discussed herein.

In some embodiments, and without limitation, the passive magnetic rotors may be supported/suspended on one lateral side by the magnetic driving rotors, without any pin or axle engaging with the sidewall or the magnetic driving rotors. In such embodiments, the sidewall may have no openings or holes at or near the level of the rollers (e.g., where liquid and debris may be present) that would allow the passage of debris and contaminants from the roller bed to the driving system on the other side of the sidewall. In other embodiments, and without limitation, the rollers may each have a pin or axle that sits in a recess in the sidewall (e.g., a recess that does not traverse the entire thickness of the sidewall), such that the pin or axle aids in suspending and maintaining the position of the roller in the roller bed. In still further embodiments, and without limitation, the rollers may each have a pin or axle that sits in an opening in the sidewall. In such embodiments, without limitation, the opening may have a minimal diameter (e.g., the pin or axle may have a tapered and/or reduced diameter where it meets the hole to accommodate a smaller diameter hole). In such embodiments, a gasket or grommet (e.g., a low friction grommet) may be positioned between the pin or axle and the opening or hole in the sidewall to reduce or eliminate any gap between the axle or pin and the perimeter of the hole and to prevent the collection or passage of debris or contaminants in the hole.

The passive magnetic rotors (which are integral to or engaged with the rollers) may sit tightly against the interior side of the sidewalls such that the gap between the roller and the sidewall is minimized, thereby reducing or preventing the accumulation of debris and contaminants between the roller and the sidewall. The system may also include a gasket between the passive magnetic rotors and the sidewall to further block and reduce the accumulation of any debris between the roller and the sidewall. For example, and without limitation, the gasket may be circular and be positioned along the perimeter of the face of the passive magnetic rotor.

The rollers may be made from plastic, steel, aluminum, or other materials, and may include surface features thereon, such as rubber coating to create friction between the conveyed items and the rollers. In some embodiments, and without limitation, the surface of the rollers may include pegs, bristles, and/or other structures for grasping the conveyed items. In some embodiments, and without limitation, the rollers may have a water-proof surface (e.g., for a produce wash table or other implementation that utilizes water or other liquids), such as a rubberized coating. In some embodiments, and without limitation, the rollers may include an anti-microbial surface treatment or surface materials, such as a layer comprising copper or other antimicrobial material.

In some embodiments, and without limitation, in the operational state the rollers are indirectly driven by a driving system positioned outside of the sidewalls of the conveyor bed. In some embodiments, and without limitation, the driving system may include a motor and a transmission assembly that connects the motor to a plurality of rotary shafts and drives the rotary shafts in a uniform direction. The motor may be any of various kinds of motors (e.g., an AC motor, a servo motor, etc.) and the transmission assembly may include a chain (e.g., a roller chain, silent chain, etc.) or belt (e.g., a toothed belt, V-belt, etc.) and a series of sprockets, where the sprockets are connected to the motor by the chain or belt, which may drive rotation of the sprockets as the motor spins. The sprockets, in turn, may be connected directly or indirectly to the magnetic driving rotors. For example, and without limitation, the sprockets may be connected to the magnetic driving rotors via a common axle. In other examples, and without limitation, the sprocket may be coupled directly to the magnetic driving rotors by a coupling or joint. The assembly of the sprockets and magnetic driving rotors may be positioned on the exterior of the conveyor bed, for example, on the outer side of one of the sidewalls. The magnetic driving rotors may be positioned near or at an outside surface of one of the sidewalls, such that they may be magnetically coupled to the passive magnetic rotors on the opposite side of the sidewall. The sidewall may be made from a non-magnetic, rigid, and sturdy material (e.g., stainless steel, aluminum, polymer, composite, etc.).

The motor may be in electronic communication with a controller. The controller may have analog or digital controls for turning the motor on or off, and/or to set a rate at which the motor cycles the chain or belt. In some examples, and without limitation, the controller may be in electronic communication with a computer (e.g., a system having a microprocessor), which may positioned at or near the conveyor bed or may be remote and have a wired or wireless connection to the controller. Such a computer may include software capable of directing the controller to signal the motor to cycle the chain or belt at various speeds.

In some embodiments, and without limitation, each of the magnetic driving rotors may be engaged with a separate motor. For example, each magnetic driving rotor may be connected to and driven by its own AC motor, a servo motor, etc. The motors may be in electronic communication with a controller. The controller may have analog or digital controls for turning the motors on or off, and/or to set a rate at which the magnetic driving rotors spin. In some examples, and without limitation, the controller may be in electronic communication with a computer (e.g., a system having a microprocessor), which may positioned at or near the conveyor bed or may be remote and have a wired or wireless connection to the controller. Such a computer may include software capable of directing the controller to signal the motors to drive rotation of the driving rotors at various speeds.

The magnetic driving rotors may have various arrangements of magnets therein. For example, and without limitation, the magnetic rotor may have a plurality of small magnets embedded in the surface thereof, wherein the magnets are arranged such that the polarity of adjacent magnets alternates. The passive magnetic rotor may have a complementary pattern of magnets, such that as the magnetic driving rotor rotates, the magnets of the passive magnetic rotor stay aligned with the oppositely poled magnets of the magnetic driving rotor. For example, the magnets of the passive magnetic rotors may be simultaneously attracted by the oppositely poled magnets of the magnetic driving rotor and repelled by the adjacent like-poled magnets of the magnetic driving rotor, thereby maintaining the position passive magnetic rotor relative to the corresponding magnetic driving rotor.

In other examples, and without limitation, the magnet driving rotor may have magnets arranged with polar orientation of the magnets all matching (e.g., the positive poles may all be facing outward from the face of the magnetic driving rotor), and the passive magnetic rotor may have its magnets arranged with matching polar orientations, such that they have the opposite polarity to the magnets of the magnetic driving rotor and
  the rotors are attracted to one another (e.g., the negative poles may all be facing outward from the face of the passive rotor). In still further examples, and without limitation, the magnet driving rotor may have magnets arranged with polar orientation of the magnets all matching (e.g., the positive poles may all be facing outward from the face of the rotor), and the passive magnetic rotor may have its magnets arranged with matching polar orientations, such that they match the orientation of the magnets of the magnetic driving rotor and the rotors are repelled by one another (e.g., the positive poles may all be facing outward from the face of the rotor). In such examples, the passive magnetic rotor may be suspended in the conveyor bed by a pin or rod engaged with a sidewall of the conveyor bed. In still further embodiments, and without limitation, magnetic driving rotor may include two semicircular magnets of opposite polarity running along the perimeter of the magnetic driving rotor, and the passive magnetic rotor may have a complementary arrangement of semicircular magnets, such that the magnets experience the same attraction and repulsion forces as described in the above example. Various other arrangements of permanent magnets are also contemplated within the scope of the present invention.

Without limitation, the driving system may incorporate electromagnets in some embodiments of the present invention. For example, and without limitation, rather than having a motor and a driving belt or chain, the magnets in the face of the driving magnetic rotor may be electromagnets in electronic communication with an electronic controller (e.g., an electronic control circuit having manual controls for a human operator, an electronic control circuit having a processor that controls the current flowing to the electromagnets, etc.). The electronic control circuit may alternate the current applied to each electromagnet to alternate the polarity of each of the electromagnets in a coordinated fashion. For example, the polarity of the magnets may be controlled such that adjacent magnets always have opposite polarities. Additionally, the passive magnetic rotor may have permanent magnets arranged in a pattern that corresponds to the pattern of electromagnets in the magnetic driving rotor (e.g., the magnets may be about the same size and have a corresponding position in the passive rotor), where the permanent magnets alternate in polarities such that adjacent magnets have opposite polarities. In such a design, the alternating polarities of the electromagnets may propel rotation of the passive rotor as the polarities of each of the electromagnets cycle between positive and negative in a coordinated alternating pattern. The speed of the rotation of the passive magnetic rotor (and the roller) may be controlled by the frequency of the alternating current applied to the electromagnets. The electronic controller may have analog or digital controls for turning the electromagnets on or off, and/or to set a rate at which the electromagnets alternate their polarity. In some examples, and without limitation, the controller may be in electronic communication with a computer (e.g., a system having a microprocessor), which may positioned at or near the conveyor bed or may be remote and have a wired or wireless connection to the controller of the electromagnets. Such a computer may include software capable of directing the controller to signal the electromagnets to switch polarities at various rates and in various patterns.

Other implementations of electromagnets are contemplated within the scope of the present invention as well. For example, and without limitation, a driving system may include a motor and a driving chain or belt that may be used with rotors that include electromagnets of constant polarity, rather than permanent magnets.

Without limiting the invention, the conveyor system may also include a sweeping device or clean-out bar that may be used to periodically clear produce or other items from the conveyor bed. The sweeping device may be a bar that can be passed closely over the rollers of the convey bed from the input end of the conveyor bed to the output end, drawing any produce or other items or materials out of the conveyor bed. Like the rollers of the conveyor system, the sweeping device may be connected to an exterior driving mechanism. In some embodiments, and without limitation, the exterior driving mechanism may be connected to the sweeping device by magnetic force across a sidewall of the conveyor bed. The sweeping device may include a driving system that may be on the exterior side of one or both of the sidewalls of the system and a sweeping arm that is connected to the driving system by magnetic force across the sidewall. For example, and without limitation, the conveyor system may have a sweeping device motor (e.g., an AC motor, a servo motor, etc.) that is connected to a sprocket that drives the rotation of a driving belt or chain. The driving belt or chain may be attached to a magnetic coupler that is adjacent to the sidewall such that it can magnetically couple to a sweeping bar in the conveyor bed on the opposite side of the sidewall. As the driving belt or chain is advanced by the sprocket, it may draw the sweeping bar along the conveyor bed.

The sweeping device motor may be in electronic communication with a controller. The controller may have analog or digital controls for turning the motor on or off, and/or to set a rate at which the motor cycles the chain or belt. In some examples, and without limitation, the controller may be in electronic communication with a computer (e.g., a system having a microprocessor), which may positioned at or near the conveyor bed or may be remote and have a wired or wireless connection to the controller. Such a computer may include software capable of directing the controller to signal the sweeping device motor to cycle the driving chain or belt at various speeds. In some examples, a single computer may be in electronic communication with the controller for the sweeping device motor and the controller for the one or more motors for driving the magnetic driving rotors. In such examples, and without limitation, such a computer may include software capable of (1) directing the controller of the sweeping device to signal the sweeping device motor to cycle the driving chain or belt at various speeds and (2) directing the one or more motors driving the magnetic driving rotors to run at various speeds.

Other implementations and designs of the sweeping device are contemplated within the scope of the present invention. For example, and without limitation, the sweeping bar may be attached through a sidewall of the conveyor bed directly to a driving belt or chain located on the outer side of the sidewall.

It is to be understood that there may be additional variations in the design of the conveying systems described herein. For example, and without limitation, the conveyor bed may have various linear, curved, and/or multi-directional conveying paths. Also, the conveying system of the present invention may be adapted to various industries and processes that utilize roller conveyors. For example, the conveyor system of the present invention may include rollers that are spaced apart at a predetermined distance (along with other related adaptations) and/or have gaps along their lengths (e.g., the rollers may consist of spaced parallel disks on an axle shaft) to function as a sizing table for produce or other sizing applications. Other alterations and applications of the conveyor systems described herein are within the scope of the present invention.

In some embodiments, and without limitation, the present invention relates to a conveying assembly that includes a roller conveyor bed having a plurality of rollers held therein, sidewalls (retaining walls) positioned longitudinally along the conveyor bed to prevent produce or other items from falling off of the conveyor, at least one motor for driving the rotation of the rollers, a plurality of sprocket and bearing assemblies (transmission assemblies) for driving the rollers, a driving chain connecting the plurality of sprocket and bearing assemblies, a plurality of magnetic driving rotors for connection to the sprocket and bearing assemblies, and a plurality of passive magnetic rotors that may be magnetically engaged with the magnetic driving rotors through the sidewall. Each of the plurality of passive magnetic rotors may be embedded in one of the rollers such that the passive magnetic rotors are tightly positioned in an end of the roller with little or no protrusion from the end of the roller. The passive magnetic rotors may sit flush against the interior side of the sidewall and a gap between outer circumference of the rollers (e.g., the brush portion) and the sidewall may be minimized, thereby reducing accumulation of debris and contaminants between the roller and the sidewall. The gap between each of the rollers and the sidewall may be less than about 5 mm. Each of the passive magnetic rotors may further include a gasket that sits between the passive magnetic rotor and the sidewall, such that the gasket further block and prevent the accumulation of any debris between the rollers and said sidewall.

The magnetic driving rotors may include a plurality of magnets arranged in a first alternating polarity pattern around the axis of the magnetic driving rotor. The passive magnetic rotors may include a plurality of magnets arranged in a second alternating polarity pattern around the axis of the passive magnetic rotor. The first alternating polarity pattern and the second alternating polarity pattern may be complementary and may be aligned across the sidewall, such that each of the negative poles in the first alternating polarity pattern is aligned with one of the positive poles in the second alternating polarity pattern and each of the positive poles in the first alternating polarity pattern is aligned with one of the negative poles in the second alternating polarity pattern.

The conveying assembly may also include passive gears between each pair of adjacent sprockets, where the passive gears may be closer to the common plane on which the axes of the sprockets sit than the point along the outer circumference of the sprocket that is furthest from the common plane. The driving chain may be routed around the sprockets and the passive gears to create a sinusoidal path for the driving chain. The driving chain may be routed through the motor and the force generated by the motor may be transferred through the driving chain to the sprockets. In some implementations, the motor may be attached to an axle of one of the plurality of sprocket and bearing assemblies, and the force generated by the motor may be transferred through the axle to the driving chain to the other sprockets in the plurality of sprocket and bearing assemblies.

In some embodiments, and without limitation, the present invention relates to a conveying assembly that includes a conveyor bed having a sidewall, a plurality of rollers aligned in the conveyor bed on a first side of a sidewall, each roller having a recess in an end thereof, a plurality of passive magnetic rotors, each embedded in the recess of one of the plurality of rollers, and a plurality of magnetic driving rotors located on a second side of the sidewall for magnetically engaging the plurality of passive magnetic rollers across the sidewall, where rotation of the magnetic driving rotors drives the rotation of the passive magnetic rotors. The passive magnetic rotors may be tightly embedded in the recesses of the rollers with little or no protrusion from the end of the rollers. The passive magnetic rotors may sit flush against the interior side of the sidewall such that there is a minimal gap between the roller and the sidewall, thereby reducing accumulation of debris and contaminants between the roller and sidewall. The conveyor assembly may further include a gasket between each of the passive magnetic rotors and the sidewall to further block and prevent the accumulation of any debris between the rollers and the sidewall. The magnetic driving rotors may include a plurality of magnets arranged in a first alternating polarity pattern around the axis of the rotor. The passive magnetic rotors include a plurality of magnets arranged in a second alternating polarity pattern around the axis rotor, where the second alternating polarity pattern is complementary to the first alternating polarity pattern.

The assembly may further include a plurality of sprocket and bearing assemblies (transmission assemblies), a driving chain, and a motor, where each of the plurality of sprocket and bearing assemblies may be fixedly connecting to one of the magnetic driving rotors, the driving chain is connected to each of the sprockets, and the motor drives the rotation of the chain. In other examples, the assembly may include a plurality of motors, each being engaged with one of the plurality of magnetic driving rotors, such that each motor individually drives the rotation of one of the magnetic driving rotors.

In some embodiments, and without limitation, the present invention relates to a magnetically driven conveyor system, comprising at least one barrier; a plurality of passive magnetic rotors on a first side of the barrier; and a plurality of magnetic driving devices located on a second side of the barrier for magnetic engagement with the plurality of passive magnetic rotors across the barrier, where the magnetic driving devices drive the rotation of the passive magnetic rotors. The system may include at least one motor for driving the rotation of the magnetic driving devices. In some examples, and without limitation, the system may include a plurality of motors, each being engaged with one of the plurality of magnetic driving devices, such that each motor individually drives the rotation of one of the magnetic driving devices. In some examples, each of the magnetic driving devices may include at least one electromagnet, and the magnetic driving devices may drive the rotation of said passive magnetic rotors by alternating polarity of the at least one electromagnet.

In some embodiments, and without limitation, the present invention relates to a method of conveying items on a roller conveyor system that includes using a motor to pull a driving chain and rotate a plurality of transmission assemblies, where the transmission assemblies each include a sprocket that is engaged with the driving chain; magnetically driving a plurality of passive magnetic rotors that are each attached to one of a plurality of rollers, where each of the plurality of transmission assemblies includes a magnetic driving rotor that rotates with the sprocket and is magnetically engaged with one of the plurality of passive magnetic rotors across a barrier; and rotating the plurality of rollers through a fixed attachment of each of the plurality of rollers to one of the passive magnetic rotors. Each of the passive magnetic rotors may be embedded in an end of one of the plurality of rollers such that there is little to no protrusion of the passive magnetic rotor from the end of the roller.

In some embodiments, and without limitation, the present invention relates to a method of conveying items on a conveyor system, comprising using a motor to drive the rotation of a magnet driving rotor, and rotating a passive magnetic rotor through the magnetic coupling of the magnet driving rotor and the passive magnetic rotor, wherein the passive magnetic rotor and the driving magnetic rotor are separated by a barrier and there is no physical connection between the passive magnetic rotor and the driving magnetic rotor. The passive magnetic rotor may be connected to a roller in a conveyor bed, and the rotation of the passive magnetic rotor may rotate the roller. In some examples, the system comprises a plurality of magnetic driving rotors, a plurality of passive magnetic rotors, and a plurality of rollers positioned in said conveyor bed for advancing items along said conveyor bed. The magnetic driving rotors may be driven by a single motor/drive chain arrangement, in which each magnetic driving rotor includes a transmission assembly that is engaged with and is rotated by the drive chain. In other examples, the system may include a plurality of motors, each of the plurality of motors being engaged with one of the plurality of magnetic driving devices.

It is an object of the present invention to provide a sanitary conveying system that minimizes the accumulation of contaminants and debris within the conveyor bed.

It is also an object of the present invention to provide a conveying system that includes no physical connections between rollers in the conveyor bed and the mechanism for driving the rotation of the rollers.

It is also an object of the present invention to provide a conveying system having rollers that are magnetically engaged with a driving system for rotating the rollers, where the driving system is on the opposite side of a retaining wall (sidewall) that runs along the lateral sides of the conveyor bed.

It is also an object of the present invention to provide a conveyor system in which the rollers that are in close proximity to a sidewall of the conveyor bed such that there little to no gap between the outer surface of the roller (e.g., a cylindrical brush) and the sidewall.

It is also an object of the present invention to provide a conveyor system for washing and waxing applications for fruit and other produce in which there is little to no gap between the lateral end of the rotating brushes or rollers and the sidewall (sidewall) of the conveyor bed, such that bacteria and other contaminants and other debris do not accumulate between the roller brushes and the sidewall.

It is an object of the present invention to provide a sanitary conveyor for use in produce processing that requires less cleaning, allowing for longer continuous operation times and higher efficiency.

It is an object of the present invention to provide a sanitary conveyor which is quickly and easily broken down for cleaning.

Additional aspects and objects of the invention will be apparent from the detailed descriptions and the claims herein.

DETAILED DESCRIPTION

Figure 1:
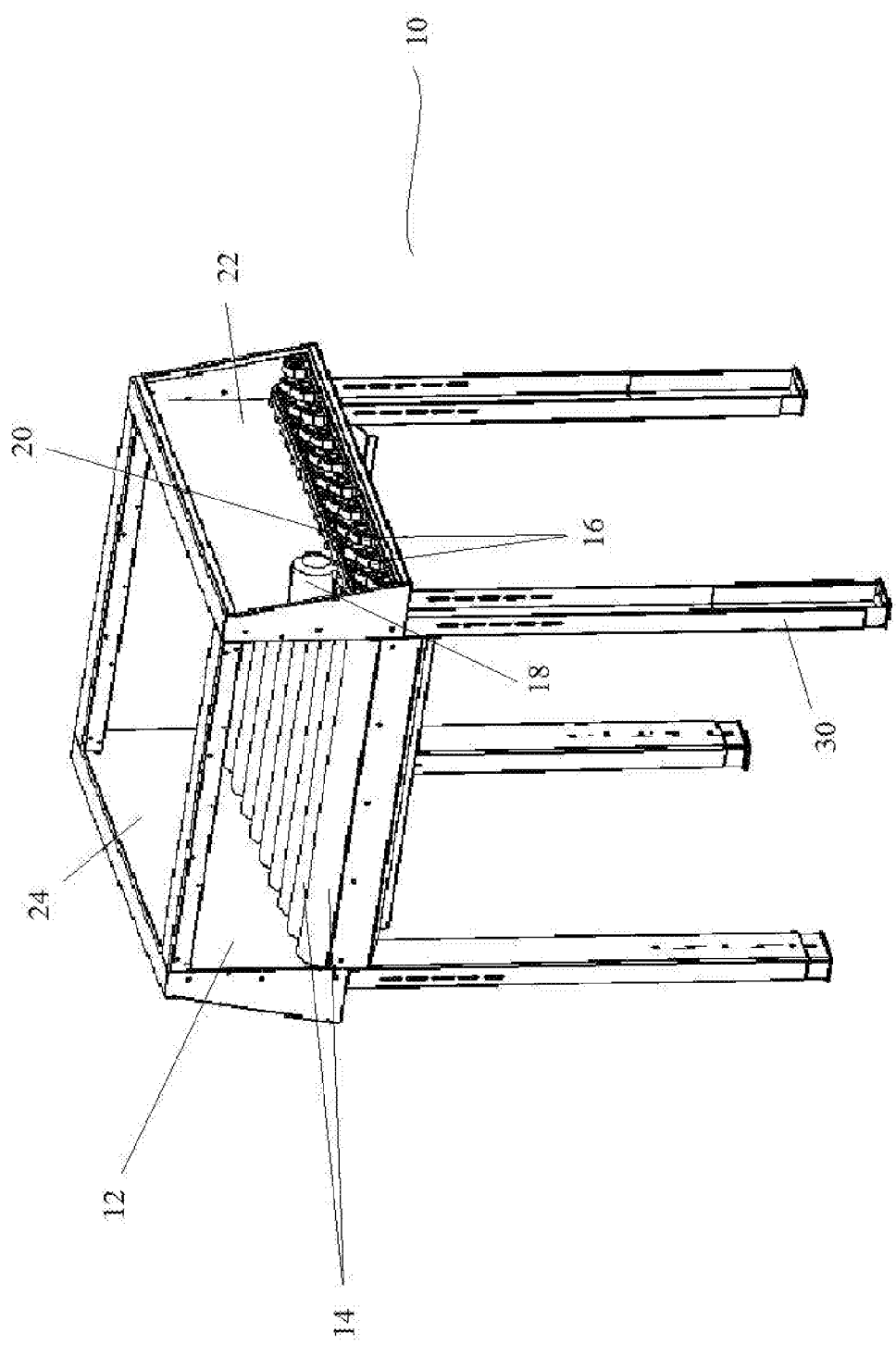
FIG. 1 is a perspective view of a conveyor system according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Referring to the drawings wherein like reference characters designate like or corresponding parts throughout the several views, and referring to FIGS. 1-18, it is seen that the present invention includes various embodiments of a conveyor bed having a magnetic rotor system for driving rollers in the conveyor bed.

The conveyor systems of the present invention may include a roller bed having a generally linear conveying path with a plurality of rollers arranged in a parallel fashion such that the rollers are generally longitudinally parallel. However, it should be understood that in some examples, and without limitation, the roller bed may have a curved or partially curved, or multi-directional conveying path such that all or a portion of the rollers are not parallel to each other and some or all of the rollers may be at an angle relative to an adjacent roller. The conveying system may have sidewalls that run parallel to the path of the conveying system for retaining produce or other items on the conveyor. On an exterior side of at least one of the sidewalls, the conveyor system may include a plurality of transmission assemblies, each of the transmission assemblies being engaged with a magnetic driving rotor associated with one of the rollers and magnetically coupled to the roller. The conveyor system may also include one or more motors for driving the rotation of the magnetic driving rotors, and the one or more motors may be connected to the transmission assemblies by a chain or belt.

The roller bed may have an input end and an output end. Produce or other materials or items may be deposited at the input end and travel along the conveying path of the roller bed towards the output end under the rotary motion imparted by the motor to the rollers through the transmission assemblies.

As an example, and without limitation, FIG. 1 shows a conveyor system 10 that includes a roller bed 12 having a plurality of rollers 14. The conveyor system 10 is exemplary of how the conveying systems of the present invention may be designed and operate, but it should be understood that the conveying systems of the present invention may be much larger (e.g., longer) and more complex than the example provided in FIG. 1. For example, conveyor system 10 may be a single module among a plurality of modules making up a larger conveying system. Various arrangements, sizes, and implementations basic exemplary conveyor system 10 are contemplated within the scope of the present invention.

The roller bed 12 is supported on a frame 30 having side walls 22 and 24 to retain the produce or other items as it flows along the roller bed 12. The rollers 14 may sit or be closely adjacent to the sidewalls 22 and 24 of the conveyor system 10 such that there is little or no gap between the circumferential surface of the rollers and the sidewall and there is little or no space in which contaminants or debris can accumulate. Each of the rollers 14 may be magnetically connected across sidewall 22 to a transmission assembly 16 for driving the rotation of the roller. Each of the transmission assemblies 16 may be coupled to a motor 18 by a chain or belt 20. The chain or belt 20 may be connected or looped over sprockets in each of the transmission assemblies 16, which are discussed in more detail below.

Figure 2:
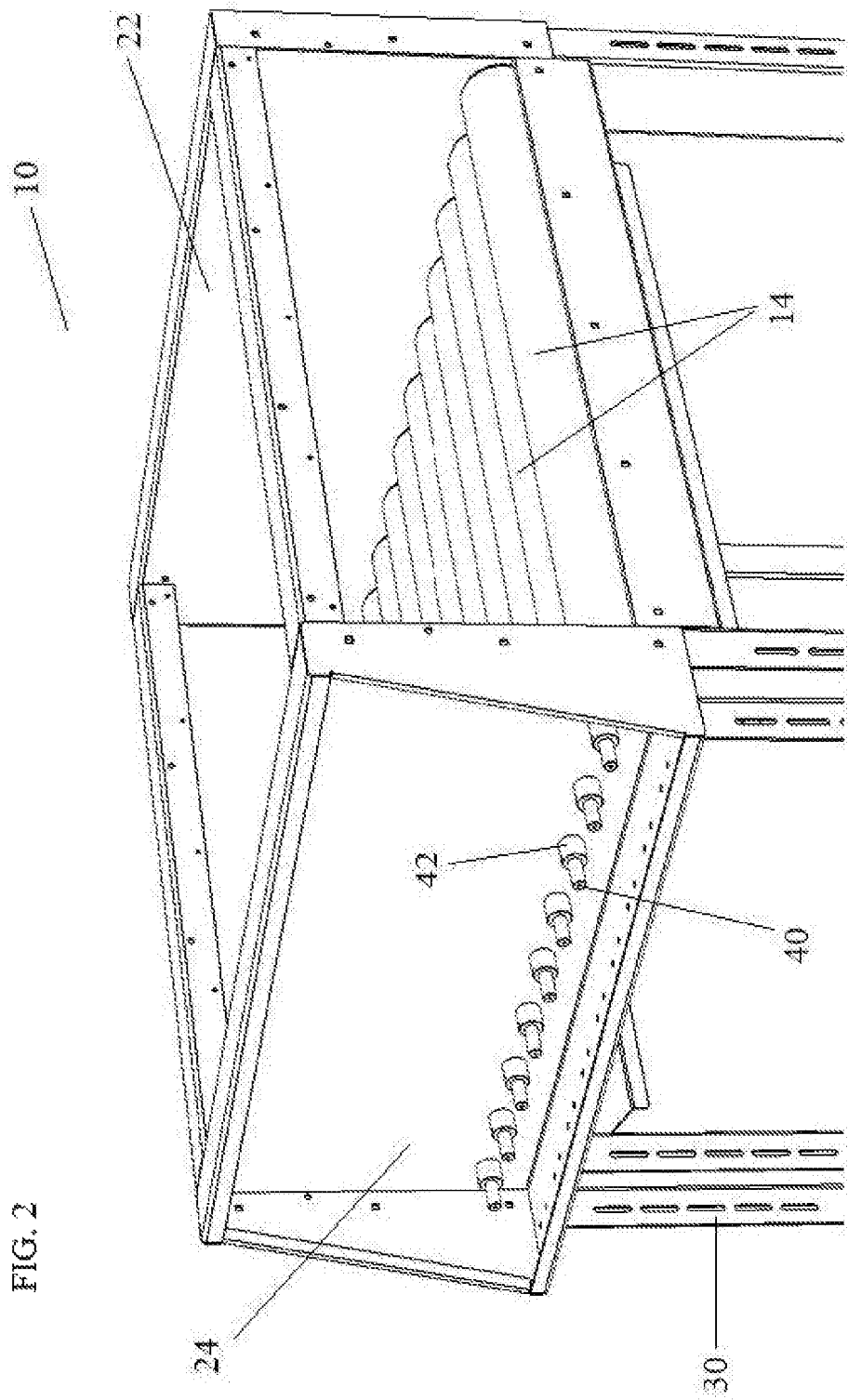
FIG. 2 is a perspective view of a conveyor system according to an embodiment of the present invention, wherein the supporting legs of the frame have been cropped to allow for a closer view.

The opposite side of each of the rollers 14 may abut or sit closely adjacent to the sidewall 24. As shown in FIG. 2, each of the rollers 14 may be supported at the sidewall 24 by a pin 40 that may be inserted into an axial tunnel or recess in the roller 14 and also pass through a corresponding hole in the sidewall 24. The position of the pin 40 and the roller 14 may be maintained by a collar 42 that is fixedly attached to the pin 40 on the outer side of the sidewall 24 and that sits closely to the sidewall 24. In some examples, and without limitation, the pin, the collar, and/or the end of the roller near or abutting the sidewall may be made from or coated with a low friction material in order to prevent drag and resistance to the rotation of the rollers during operation of the conveying system. The lateral side of the conveyor system that includes the sidewall 24, and the pin and collar assemblies may be a passive side of the conveyor system with no driving mechanism.

Figure 3:
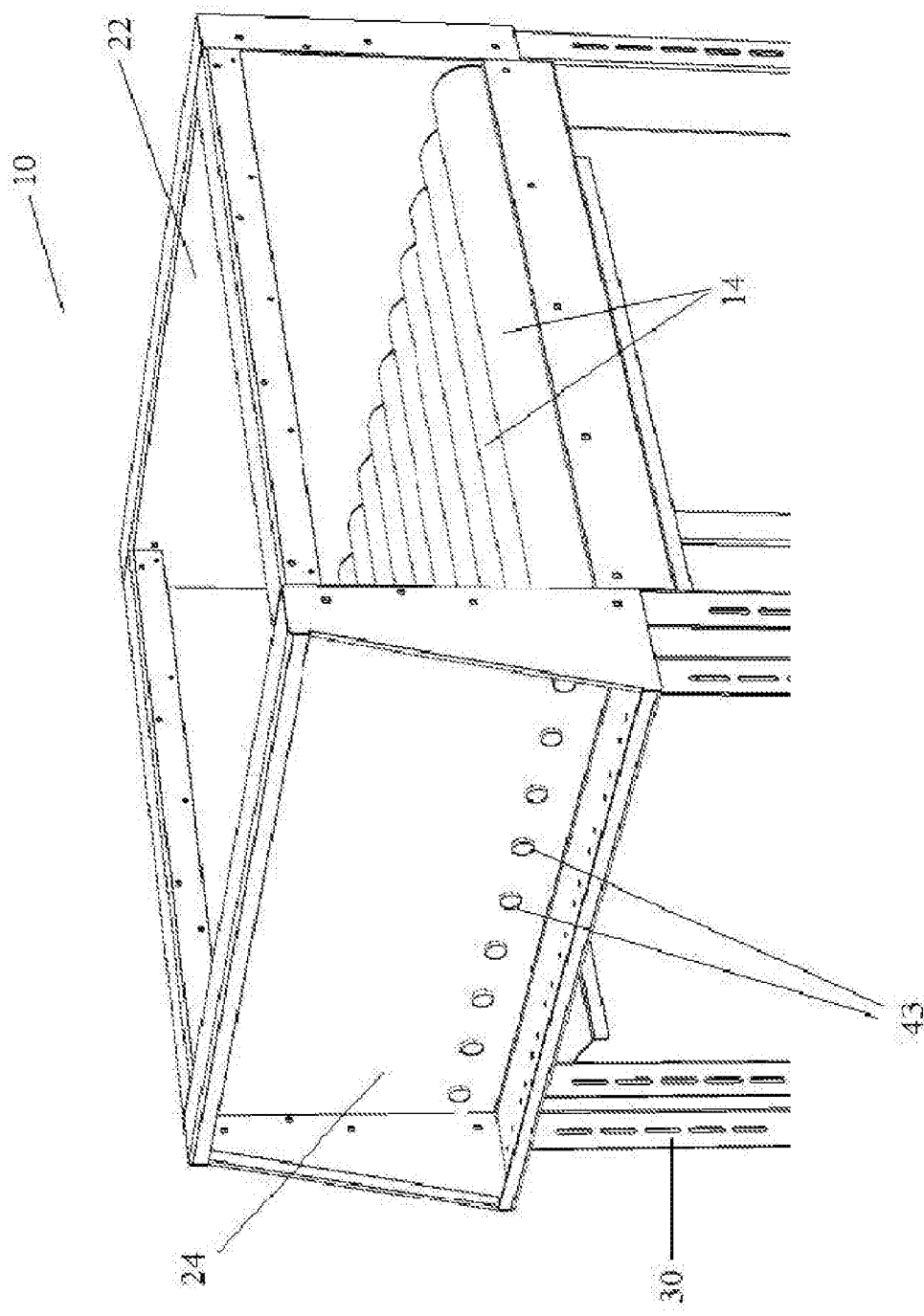
FIG. 3 is a perspective view of a conveyor system according to an embodiment of the present invention, wherein the supporting legs of the frame have been cropped to allow for a closer view.

In other embodiments, and without limitation, the rollers 14 may be supported by a pin that does not traverse the sidewall 24 on the passive side of the conveyor system. For example, and without limitation, each pin 40 may be inserted into a recess 43 in the sidewall 24, as shown in FIG. 3. Recesses 43 may have a closed end into which the end of pins 40 may be inserted. The pin 40 or pin end and the interior of the recesses 43 may be made from or coated with a low friction material in order to prevent drag and resistance to the rotation of the rollers during operation of the conveying system. In some implementations, and without limitation, a bearing assembly may be present in the recess to reduce friction between the pins 40 and the recesses 43. Such embodiments may allow for the quick disassembly of the system for cleaning, without the need to disengage a collar or other structure before removing the pin 40 from sidewall 24. Also, such embodiments may help reduce the contamination of the conveyor bed components by passage of contaminants across the sidewalls.

Figure 4:
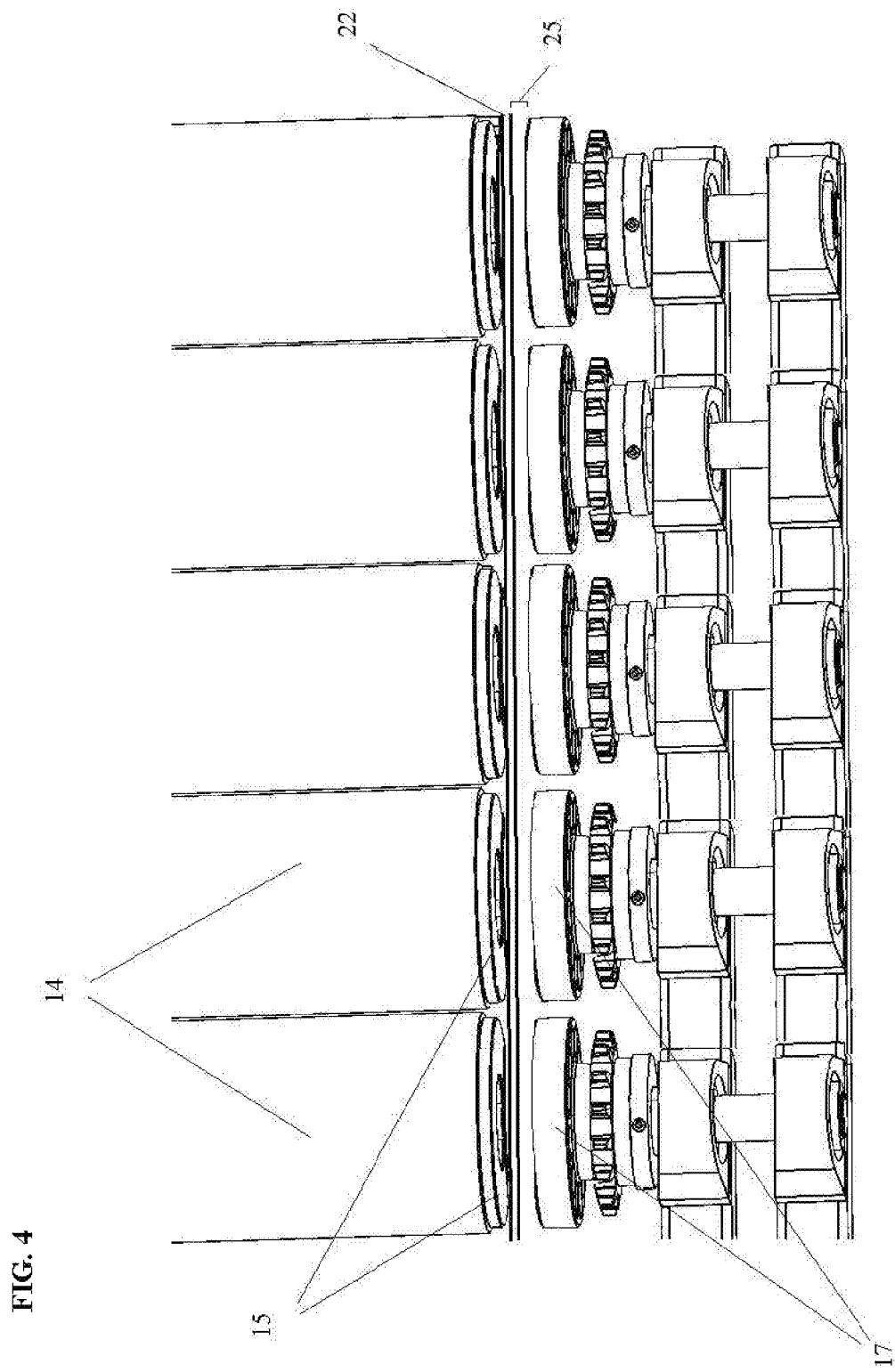
FIG. 4 is an overhead, close-up view of a conveyor bed according to an embodiment of the present invention in which the magnetic driving rotors are retracted from the sidewall of the conveyor bed, wherein the structures other than the rollers, passive magnetic rotors, magnetic driving rotors, and transmission assemblies have been cropped to allow for a closer view.

The magnet coupling arrangement of the passive magnetic rotors on the other side of the conveyor bed may allow for easy access to and disassembly of the components of the system for maintenance and cleaning. In some embodiments, and without limitation, the rollers may be disengaged from the roller bed for washing by removing the pin and collar on the passive side of the conveyor system (or, alternatively, simply pulling them from recesses 43). After removing the pin and collar assemblies, the rollers may be disengaged from the magnetic driving rotors by retracting them away from the sidewall, as shown in FIG. 4. FIG. 4 shows the magnetic driving rotors 17 retracted away from the sidewall 22 creating a gap 25 between the magnetic driving rotors 17 and the sidewall 22, such that the magnetic attraction between the driving magnetic rotors and the passive magnetic rotors is diminished, and the rollers 14 may be removed from the conveyor bed. The rollers (including the passive magnet rotors) and the retaining walls may then be washed and disinfected. No cleaning procedure may be necessary for the driving system (e.g., aside from general motor and transmission maintenance) because it may be completely isolated from the interior of the roller bed, preventing the passage of debris and contaminants from the roller bed into the driving system. In other embodiments, and without limitation, the conveyor system may include a mechanism for spreading the conveyor bed, e.g., by increasing the distance between the sidewalls to thereby provide room and access to remove the rollers and distance between the passive magnetic rotors and the driving magnetic rotors to reduce the magnetic attraction. In still further embodiments, and without limitation, the magnetic driving rotors may have electromagnets rather than permanent magnets, and the rollers may be removed by simply turning off the electromagnets, and thereby removing the magnetic attraction between the passive magnetic rotors and the driving magnetic rotors.

Figure 5:
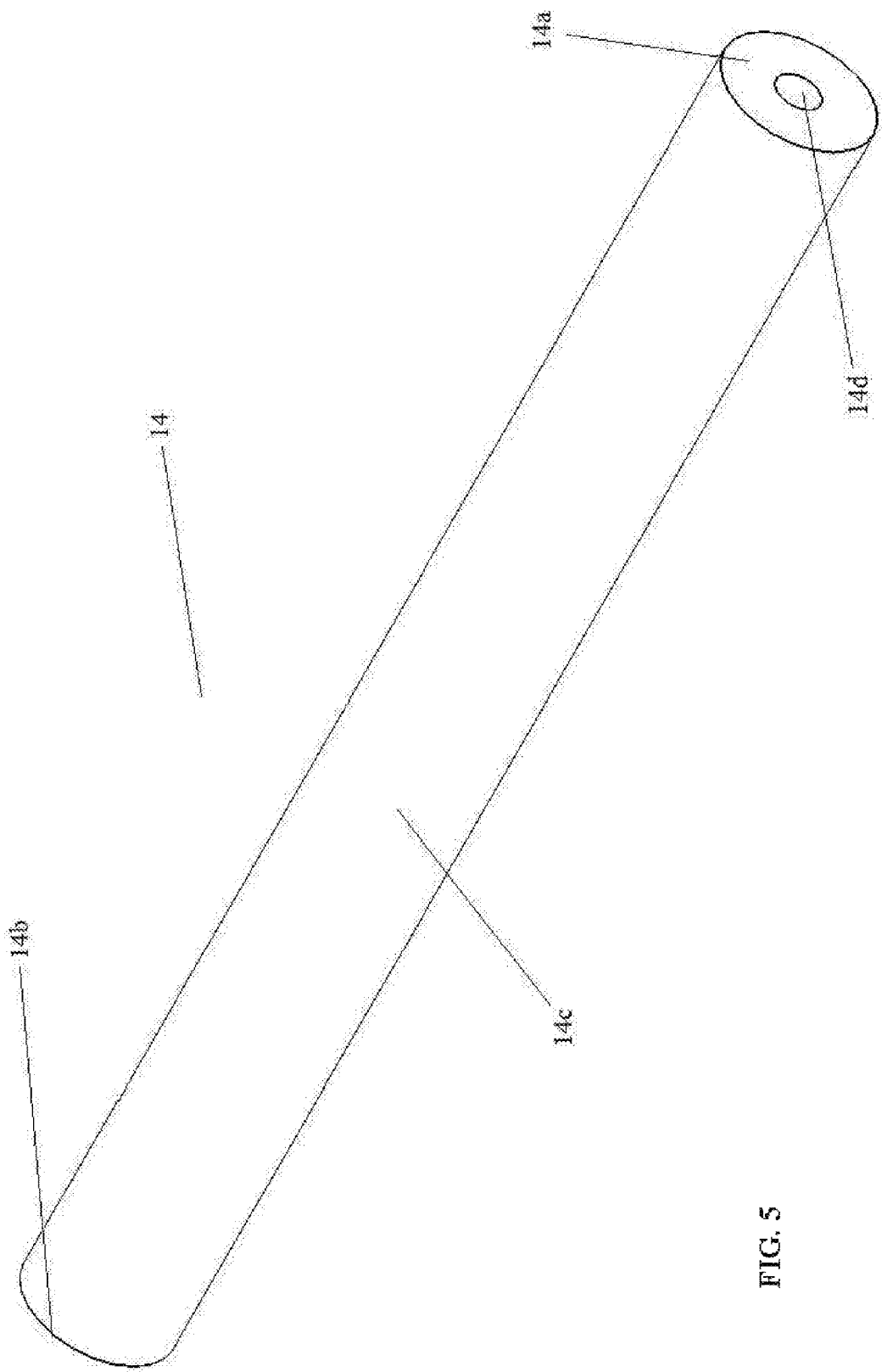
FIG. 5 is a perspective view of a roller according to an embodiment of the present invention.
Figure 6:
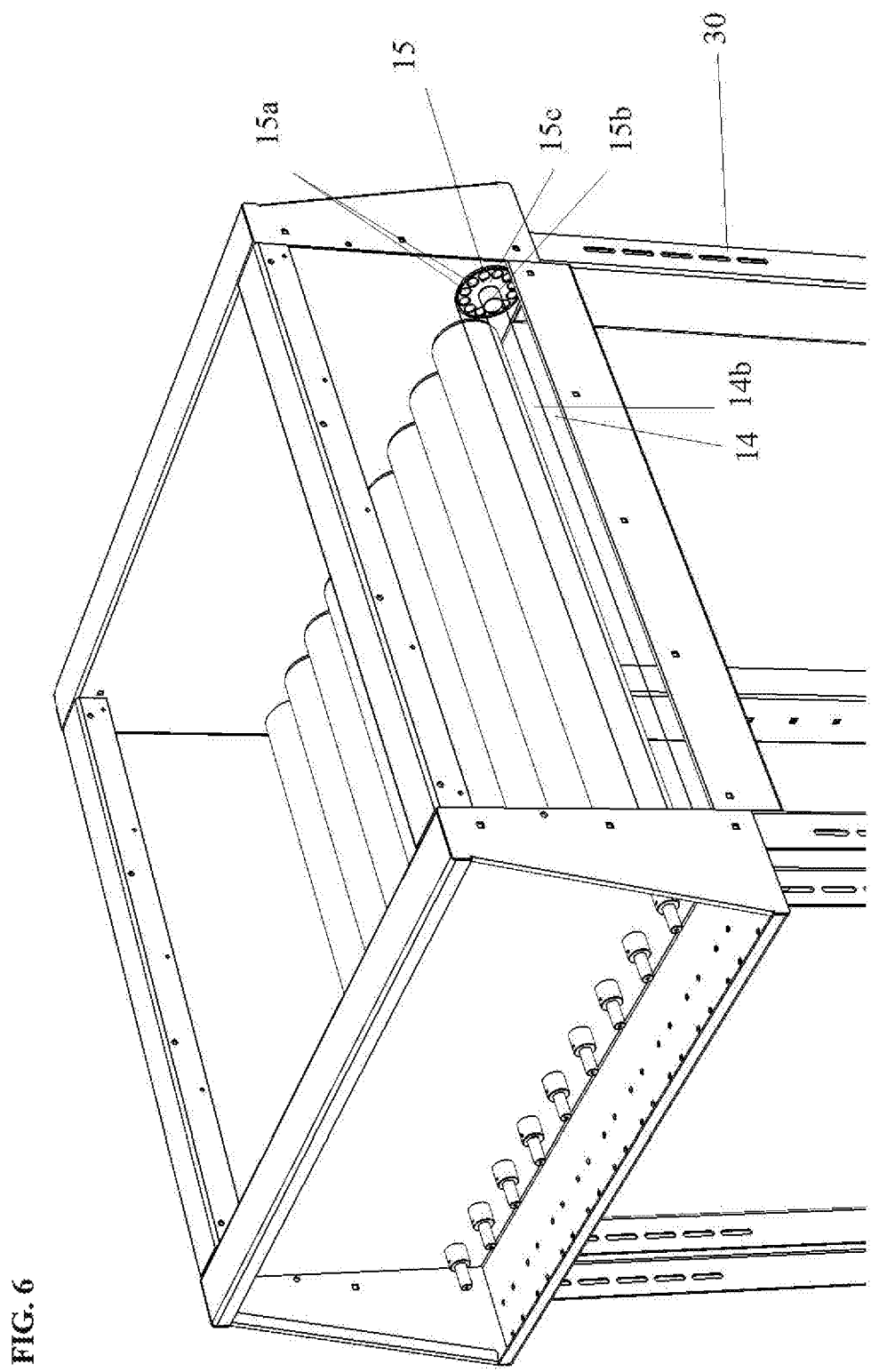
FIG. 6 is a perspective view of a conveyor system according to an embodiment of the present invention, in which the arrangement of a roller and a passive magnetic rotor are shown through a transparent representation of the first roller, and the supporting legs of the frame have been cropped to allow for a closer view.

The rollers of the conveyor system may be of uniform length and diameter, and they may be positioned in a parallel arrangement such that the axes of the rollers are about perpendicular to the path of the conveyor bed. FIGS. 5-6 provide views of exemplary rollers according to the embodiments of the present invention. In some embodiments, the rollers 14 may have a slot, hole, or tunnel (e.g., a cylindrical tunnel) running down the axial center thereof, which may receive all or a portion of a passive magnetic rotor assembly. The slot, hole, or tunnel allows the passive magnetic rotor assembly to be embedded in the roller such that the outer diameter of the roller may abut or sit within a short distance of the sidewall (e.g., about 1 mm to about 5 mm, or any value or range of values therein). In some implementations, and without limitation, the roller may have two recesses of different diameters for allowing all or nearly all of the passive magnetic rotor to be embedded in the roller. For example, the roller may include an axial tunnel for receiving an axial anchor of the passive magnetic rotor (see, e.g., cylindrical anchor 15c in FIG. 6), and an outer recess having a greater diameter for receiving the body of the passive magnetic rotor (see, e.g., disk 15b in FIG. 6). The dual recess may allow the entire passive magnetic rotor to be embedded in the end of the roller.

As an example and without limiting the invention, FIG. 5 shows an exemplary roller 14 having a cylindrical shape and with two lateral ends 14a and 14b, an outer circumferential surface 14c, and a tunnel 14d running down the axial center of the roller 14. The cylindrical tunnel 14d may have a shape that accommodates a passive magnetic rotor assembly such that the passive magnetic rotor assembly sits completely or nearly completely within the roller 14.

Without limiting the invention, FIG. 6 shows a transparent view of an exemplary roller 14t installed in a conveyor system 10. The passive magnetic rotor 14t can be seen engaged with an end of the roller 14t. The passive magnetic rotor 14t may include a disk 15b in which a circumferential arrangement of recesses 15a may be formed. Circular magnets may be embedded in the recesses 15a on the outer side of the passive magnetic rotor. The passive magnetic rotor 15 may also include a cylindrical anchor 15c for engaging with the tunnel 14d of the roller 14t. The anchor 15c may fit snuggly within the tunnel 14d such that the relative positions of the passive magnetic rotor and the roller are fixed. The passive magnetic rotor assembly may also sit flush in the roller such that the outer circumferential surface of the passive magnetic rotor and is flush with the outer circumferential surface of the roller, and thus little or no gap may be formed between the roller and the sidewall of the conveyor system. The passive magnetic rotor assembly may also have a snug fit to prevent slipping between the passive magnetic rotor assembly and the roller. In some examples, and without limitation, the tunnel may include one or more grooves, notches, or other recesses or protrusions running down its length. The passive magnetic rotor assembly may in turn have a portion having protrusions or recesses that complement the shape of the recesses or protrusions in the tunnel.

In some examples, and without limitation, the rollers may have an axial length in a range from about one foot to about 8 feet (e.g., about two feet to about six feet, or any value or range of values therein). In some examples, and without limitation, the rollers may have a diameter in a range from about two inches to about one foot (e.g., about three inches to about eight inches, or any value or range of values therein), depending on whether the roller includes any protrusions on its outer surface and the length of the protrusions thereon.

Each of the rollers of the conveyor system may include an outer brush portion that may have protrusions, fibers, filaments, or pegs thereon. For example, and without limitation, the brushes may include provide bristles over the some or all of the roller surface, e.g., in particular patterns on the roller. In other examples, and without limitation, the bristles may be provided in separate longitudinal rows, circumferential rows, spiral rows, patches, etc. The fibers, filaments, or bristles of the brush may be made from various polymer materials (e.g., polyamides, polystyrene, polyester, polyolefin, polypropylene, polyurethane, polyvinylidene chloride, polyethylene, etc.; copolymers thereof; nylon; or other materials) in a flexible fiber form. In other embodiments, and without limitation, the fibers, filaments, or bristles may include other materials. The fibers, filaments, or bristles may have sufficient rigidity that they flex under the weight of a piece of produce (e.g., an apple, strawberry, tomato, etc.) or other items, but they support the weight of the produce or other items and do not collapse such that the produce lies against the roller. In some implementations, and without limitation, the conveyor system of the present invention may be configured for washing produce, in which case the roller surfaces may having relatively short, firm bristles (e.g., in a range of about 1 mm to about 20 mm, or any value or range of values therein) that do not trap excess water sprayed onto the conveyor for cleaning purposes. The protrusions on the surface of the roller may be spaced and shaped such that they can be thoroughly washed to remove any contaminants that may accumulate thereon during operation of the system. In further examples, and without limitation, the rollers may have a smooth and/or tacky outer surface that is both washable and capable of moving the produce or other materials along the conveyor.

The passive magnetic rotor assemblies may be mechanically coupled to the rollers of the conveying system, as described above, and they may also be magnetically coupled to magnetic driving rotors that are incorporated into the transmission assemblies and located on the outside of the conveyor bed (e.g., an outer side of one of the sidewalls of the conveyor system). The passive magnetic rotor assemblies may be magnetically coupled to the magnetic driving rotors across the sidewall of the conveyor system, and thus the sidewall may be a non-magnetic material and sufficiently thin to allow the magnetic driving rotors to magnetically engage the passive magnetic rotors on the opposite side of the sidewall with sufficient attractive force to drive the rotation of the rollers. For example, and without limitation, the sidewall may be made from one or more non-magnetic, rigid, and sturdy materials such as stainless steel, ceramic, polymer, composite, etc. The sidewall may have a thickness in a range of about 0.5 mm to about 10 mm (or any value or range of values therein).

Figure 7:
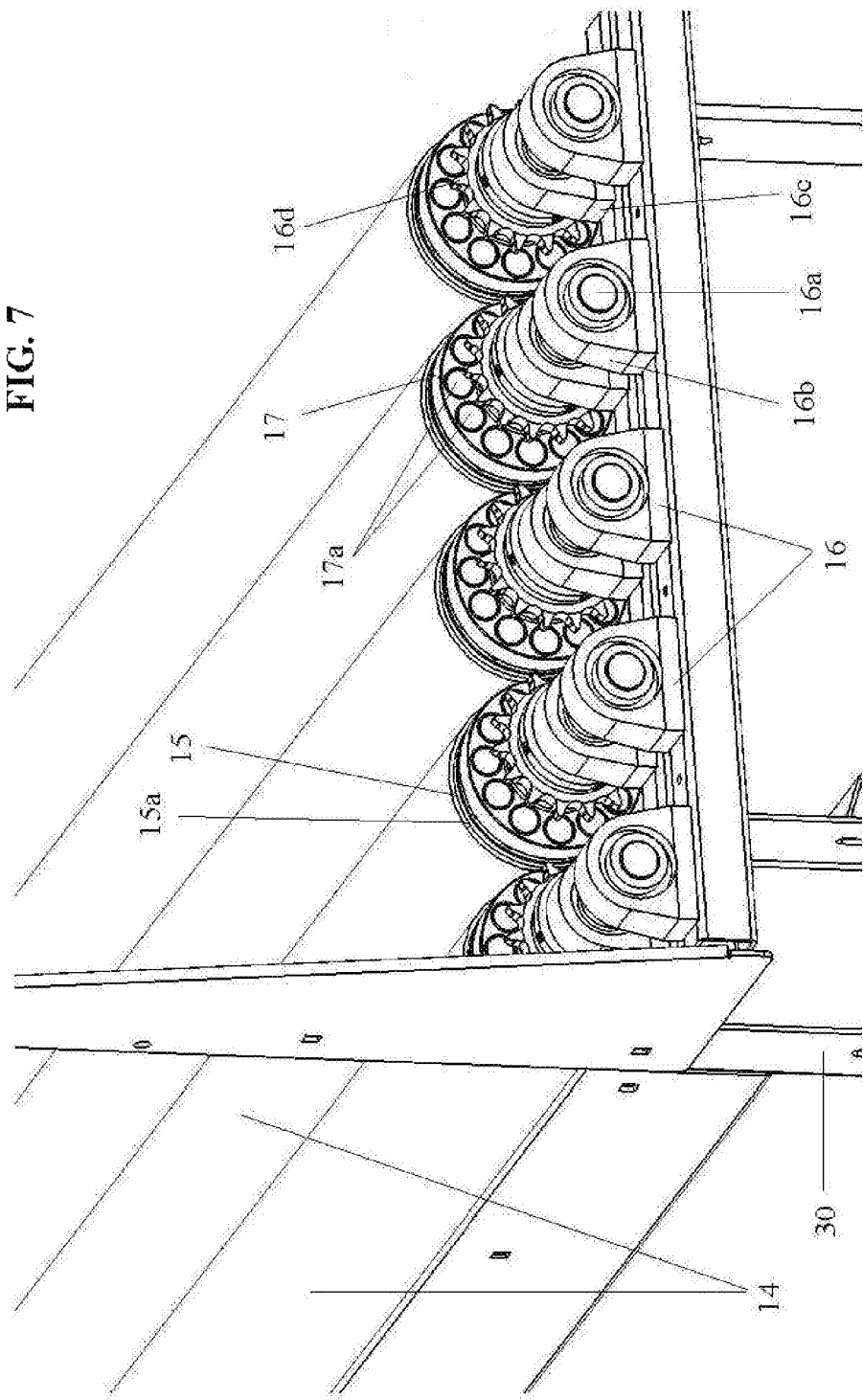
FIG. 7 is a perspective view of a conveyor system according to an embodiment of the present invention, in which the arrangement of passive magnetic rotors, magnetic driving rotors, and transmission assemblies is shown, and certain structures have been cropped to allow for a closer view, including the sidewall, portions of the frame and some of the rollers, magnetic driving rotors and transmission assemblies.

As an example and without limitation, FIG. 7 provides a view of an exemplary arrangement of the rollers 14 and the transmission assemblies 16 across the sidewall, in which the sidewall is transparent to allow an unobstructed view of the rollers 14. Each of the rollers 14 may be aligned with a transmission assembly 16. The passive magnetic rotor assemblies 15 are shown embedded in the end of the rollers 14, as discussed above. On the opposite side of the sidewall (not shown) the magnetic driving rotor 17 may be abutting or closely adjacent to the sidewall and may be aligned with the corresponding passive magnetic rotor on the opposite side of the sidewall.

Figure 8:
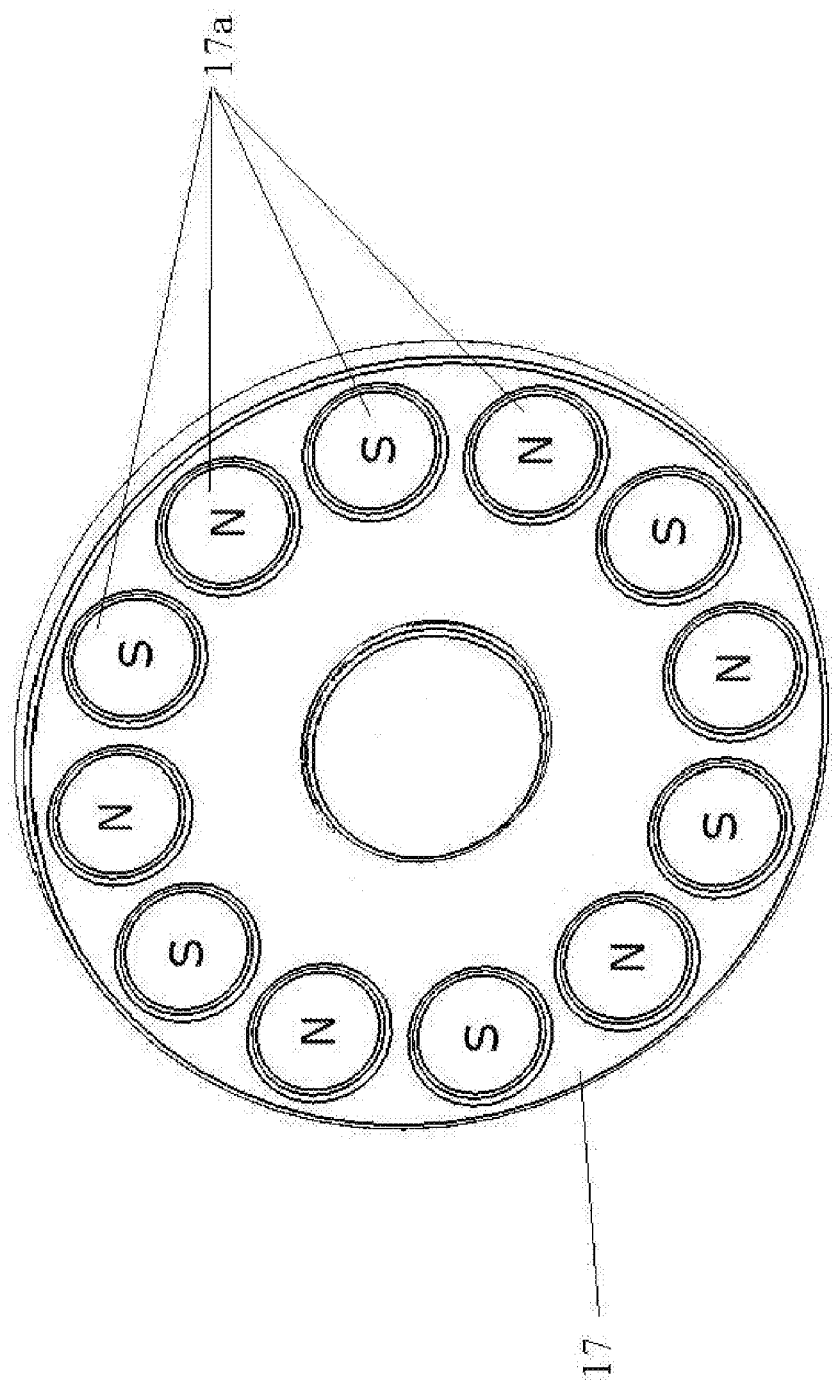
FIG. 8 is a frontal, close-up view of a passive magnetic rotor according to an embodiment of the present invention, in which passive magnetic rotor has a plurality of magnets having an alternating pattern of polarities.
Figure 9:
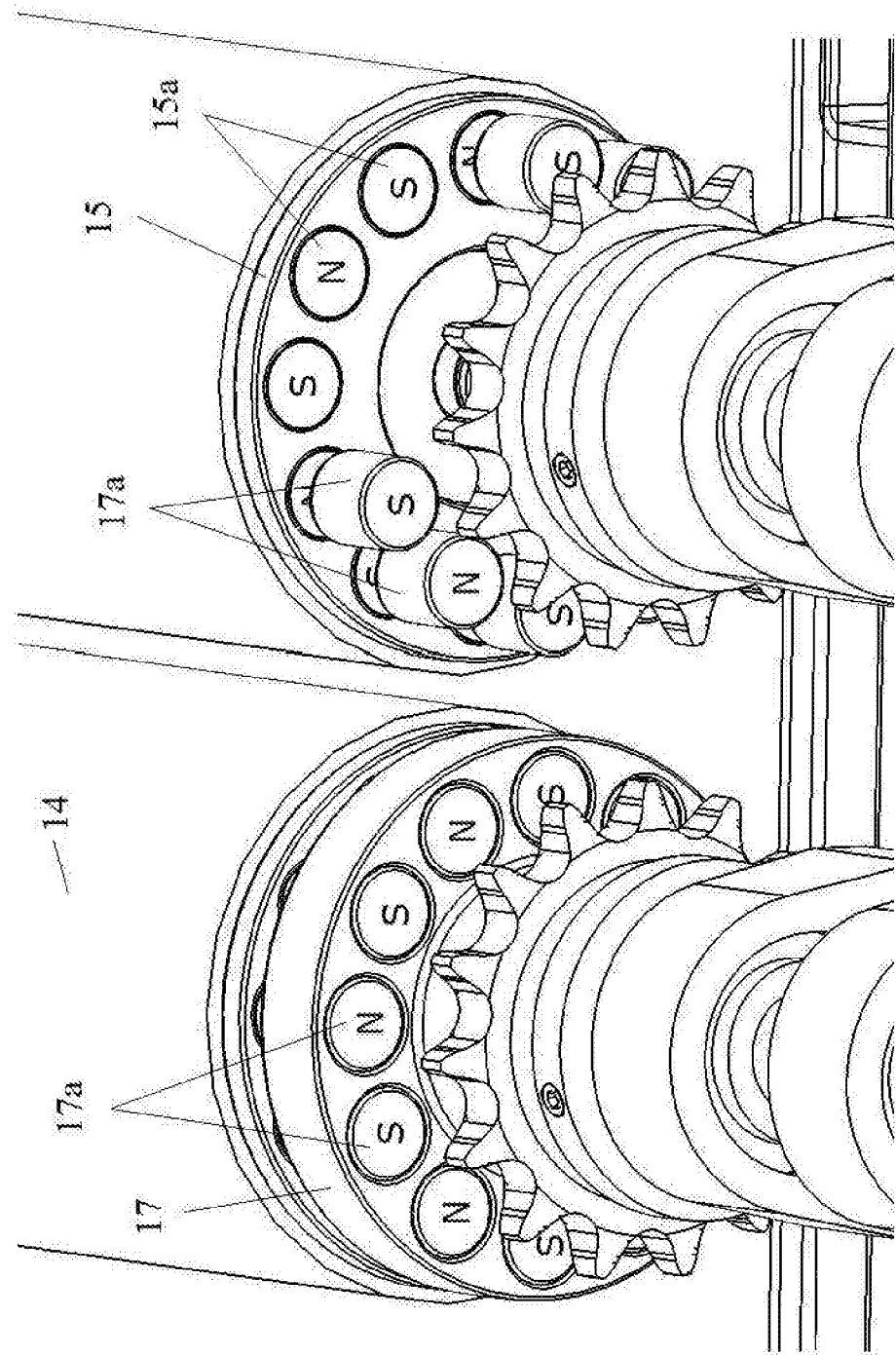
FIG. 9 is a perspective, close-up view of a conveyor system according to an embodiment of the present invention, in which the arrangement of passive magnetic rotors, magnetic driving rotors, and transmission assemblies is shown, and the alignment of magnets between the passive magnetic rotors and the driving magnetic rotors is shown, with one of the magnetic driving rotors shown as transparent. Certain structures have been cropped to allow for a closer view.

Both the passive magnetic rotor and the magnetic driving rotor may have a plurality of magnets therein. The magnetic rotor may have a plurality of small magnets embedded in the interfacing surface thereof, wherein said magnets are arranged such that the polarity of the magnets alternate between adjacent magnets on the interfacing surface. For example, FIG. 8 shows the interfacing surface of a magnetic driving rotor 17 having a circular pattern of disk magnets 17a near the circumference of the magnetic driving rotor 17, and the polarity of the outward facing surface of these magnets may alternate between north and south from magnet to adjacent magnet. The passive magnetic rotor may have a complementary pattern of magnets, such that the magnets of the passive magnetic rotor stay aligned with the oppositely poled magnets of the magnetic driving rotor as the magnetic driving rotor spins because the magnets of the passive magnetic rotors are simultaneously attracted by the oppositely poled magnets of the magnetic driving rotor with which they are aligned and repelled by the adjacent likepoled magnets of the magnetic driving rotor. For example, FIG. 9 shows an alignment of passive magnetic rotors 15 embedded within rollers 14 having a plurality of small disk magnets 15a embedded in the faces thereof, where the polarity of the magnets 15a alternate between north and south, and each of the magnets 15a is aligned with a corresponding magnet 17a of the opposite polarity in the face of the corresponding magnetic driving rotor 17. The sidewall 22 and one of the magnetic driving rotors 17 are treated as transparent (not shown) in FIG. 9 so that the alignment of the magnets 15a and 17 may be clearly shown.

In other examples, and without limitation, the magnet driving rotor may have magnets arranged such that polar orientations of the magnets all match each other (e.g., the positive poles may all be facing outward from the face of the rotor), and the passive magnetic rotor may have its magnets arranged with matching polar orientations, such that they polarity of the outer face (the interfacing surface) of the magnets is opposite to the outer face of the magnets of the magnetic driving rotor and the rotors are attracted to one another (e.g., the negative poles may all be facing outward from the face of the rotor). In still further examples, and without limitation, the magnet driving rotor may have magnets arranged such that the polar orientation of the magnets are the same, and the passive magnetic rotor may have its magnets arranged such that the polar orientations are the same and they match the orientation of the magnets in the magnetic driving rotor such that the magnetic driving rotor repels the passive magnetic rotor. The repulsion of the passive magnetic rotor may cause it to spin away from alignment with the magnetic driving rotor, and as the magnetic driving rotor spins it may drive the passive rotor to spin by repulsion. In such embodiments, and without limitation, the passive magnetic rotors may each be suspended and held in position and in alignment with the corresponding magnetic driving rotors by an axial pin or rod in the rollers that engages with a recess or opening in the sidewall.

In still further embodiments, and without limitation, the magnetic driving rotor may include two semicircular magnets of opposite polarity running along the perimeter of the magnetic driving rotor, and the passive magnetic rotor may have a complementary arrangement of semicircular magnets, such that the magnets experience the same attraction and repulsion forces as described in the above example. In yet further embodiments, the passive magnetic rotor may have a circular magnet along or near its circumference having a first polarity and the magnetic driving rotor may have a circular magnet having substantial the same size as the magnet in the passive magnet rotor, but having an opposite polarity. Various other arrangements of magnets on the passive magnetic rotors and magnetic driving rotors are contemplated within the scope of the present invention. For example, the magnets in the passive magnetic rotors do not necessarily have the same size and shape as the magnets in the magnetic driving rotor. Additionally, the passive magnetic rotors and the magnetic driving rotors do not necessarily include permanent magnets therein. For example, and without limitation, the magnetic driving motors may include electromagnets.

Figure 10:
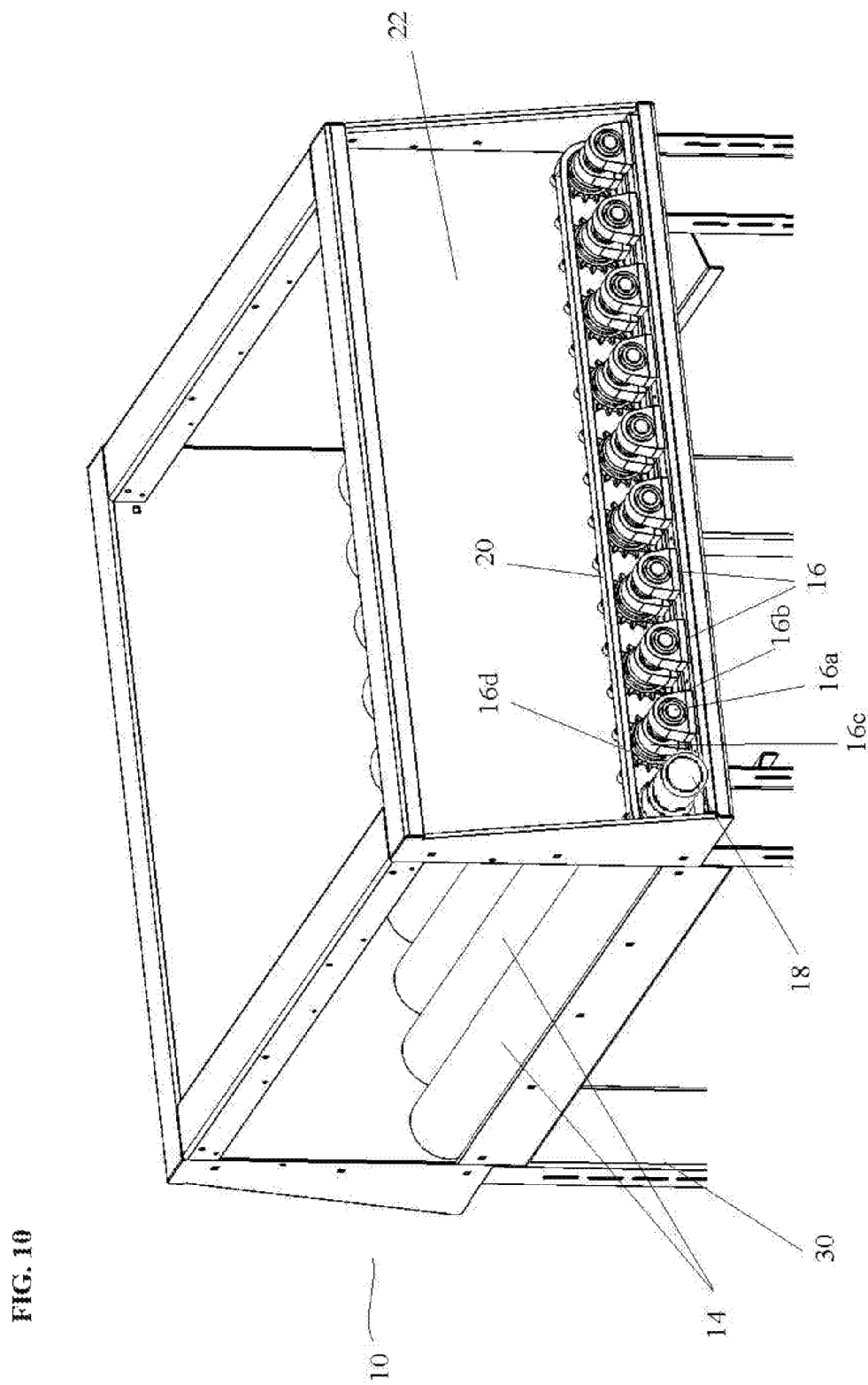
FIG. 10 is a perspective view of a conveyor system according to an embodiment of the present invention, in which the arrangement of transmission assemblies and a driving chain is shown, wherein the supporting legs of the frame have been cropped to allow for a closer view.

The transmission assemblies of the present invention provide a connection between the magnetic driving rotors and a motor. The transmission assemblies may include an axle nested within one or more bearings to provide a stable rotating structure, and a sprocket which may be connected to a chain or belt that is rotated by a motor. The chain or belt may be connected to a series of sprockets, each being a part of an individual transmission assembly. As an example, and without limiting the invention, FIG. 10 provides a similar view to that of FIG. 1 with the sidewall 22 shown intact and a driving chain 20 engaged with the sprockets 16*d*. A plurality of transmission assemblies 16 are shown on the exterior side of sidewall 22, each having an axle 16*a*, bearings 16*b* and 16*c*, and a sprocket 16*d*. The driving chain 20 may be engaged with the teeth of each of the sprockets 16*d* such that the sprockets are rotated by the driving chain as the drive shaft of the motor 18 rotates one of the driving magnetic rotors 16 (e.g., an end rotor) and the sprocket 16*d* of the end rotor, in turn, cycles the chain 20. The motor may be a servo motor, AC motor, or other electric motor that rotates an axle with which the sprocket of the end rotor is engaged. In other embodiments, and without limitation, the motor may be engaged with the chain directly and the chain may drive the rotation of all of the magnetic driving rotors. The driving chain 20 may be engaged with the teeth of the sprockets and may sit substantially horizontally above and below the sprockets, engaging with only the superiorly and inferiorly positioned teeth of the sprockets (except in the case of the end sprockets, which the drive chain may wrap around). In other implementations, the conveyor path may have a pitch angle relative to a horizontal plane (e.g., an ascending or descending conveyor path), and the rollers, transmission assemblies, and driving chain may run along or parallel to the conveyor path.

Figure 11:
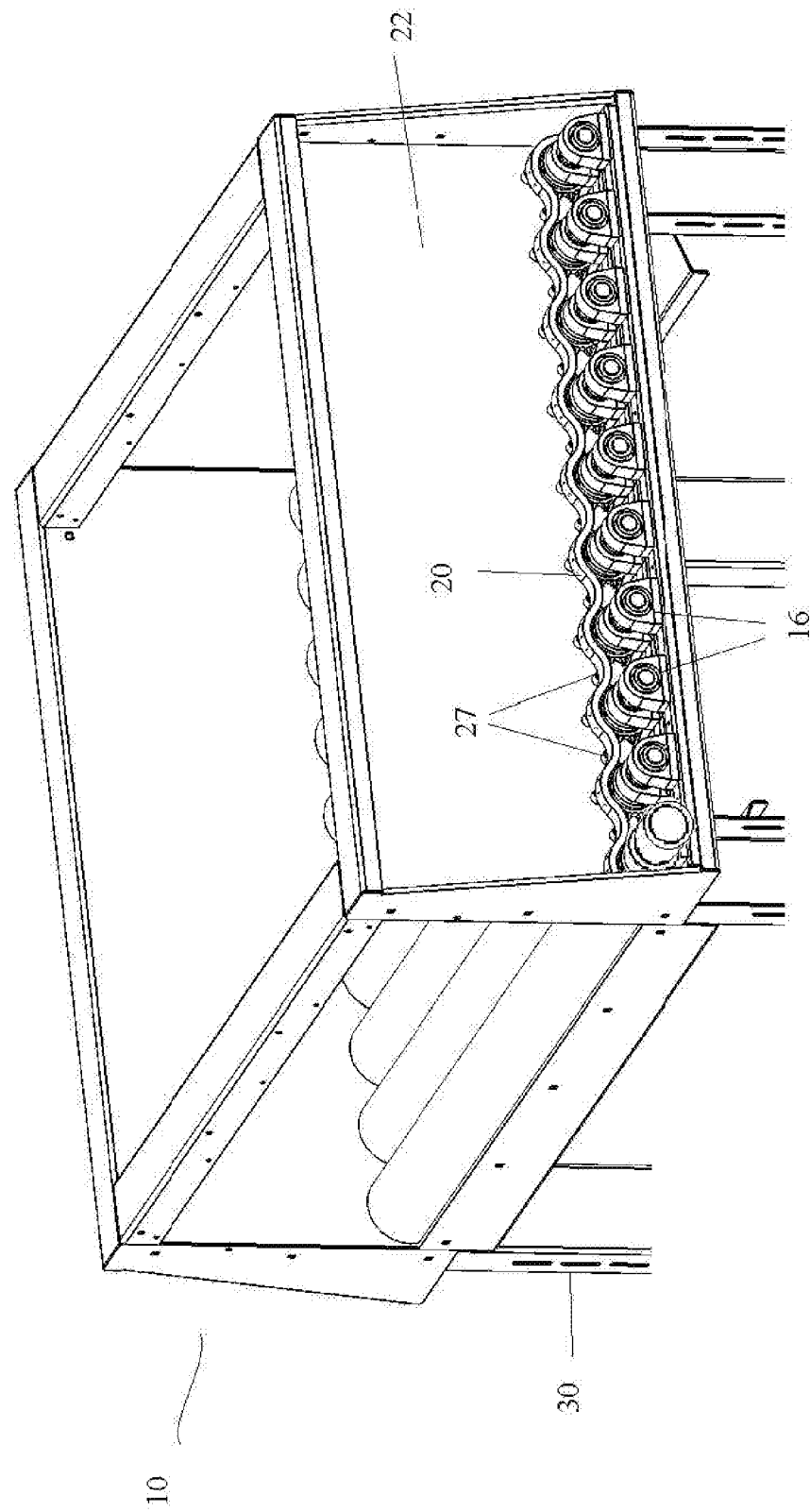
FIG. 11 is a perspective view of a conveyor system according to another embodiment of the present invention, in which the arrangement of transmission assemblies and a sinusoidal driving chain is shown, wherein the supporting legs of the frame have been cropped to allow for a closer view.

In still other implementations, and without limitation, the conveyor system may have passive gears or other structures between the sprockets that may change the path of the chain such that the driving chain engages with more teeth of each sprocket and engages with a greater portion of the circumference of each of the sprockets. The increased engagement of the driving chain with the sprockets may provide improved energy transfer efficiency between the motor and the sprockets. For example, and without limitation, FIG. 11 shows an implementation of the conveyor system 10 in which the driving chain 20 is engaged with both the teeth of the sprockets 16*d* and passive gears 27. The passive gears 27 sit between adjacent sprockets and closer to the horizontal plane on which the axles 16*a* are aligned, such that the driving chain has a sinusoidal path and engages with more teeth of the sprockets 16*d* than the chain in embodiments like that shown in FIG. 10.

Figure 12:
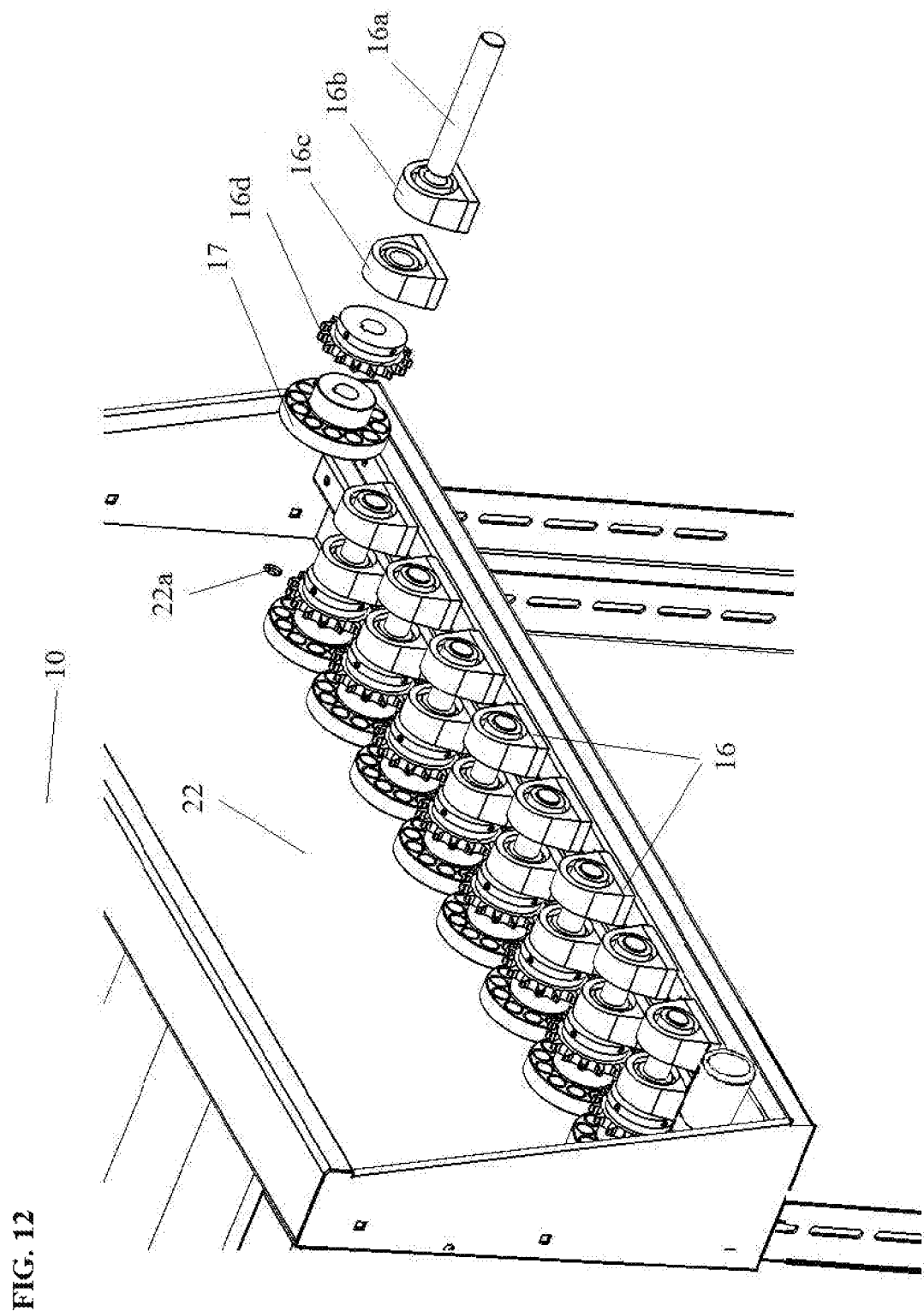
FIG. 12 is a perspective, close-up view of a conveyor system according to an embodiment of the present invention, in which an exploded view of a transmission assembly is shown. Certain structures have been cropped to allow for the close-up view.

Without limiting the invention, FIG. 12 provides an exemplary arrangement of a transmission assembly and a magnetic driving rotor according to an embodiment of the present invention. One of the transmission assemblies 16 and the associated magnetic driving rotor 17 are shown in an exploded view. In this example, it can be seen that the axle 16*a* may pass through central passages in each of the bearings 16*b* and 16*c*, the sprocket 16*d*, and the magnetic driving rotor 17 such that the passages in these structures are concentric. The sprocket and the magnetic driving rotor may be in a static relationship, being fixedly engaged to one another, such that the magnetic driving rotor spins with the sprocket. The fixed relationship of the sprocket and the magnetic driving rotor may result from direct attachment of the sprocket to the magnetic driving rotor (e.g., by one or more, bolts, pins, or other fasteners) and/or an interlocking engagement of the sprocket and the magnetic driving rotor with the axle (e.g., the axle may have one or more slots, protrusions, or other engagement structures, and the central passages of both the sprocket and the magnetic driving rotor may have engagement structures that are complementary to the engagement structures of the axle).

Although the presented exemplary embodiments include a sprocket and chain transmission system, there are substitutions and modifications that may be made to the driving system described herein, and such substitutions and modifications are within the scope of the present invention. For example, each shaft could be coupled to its next adjacent shaft by passive gears rather than by a chain or belt.

Figure 13:
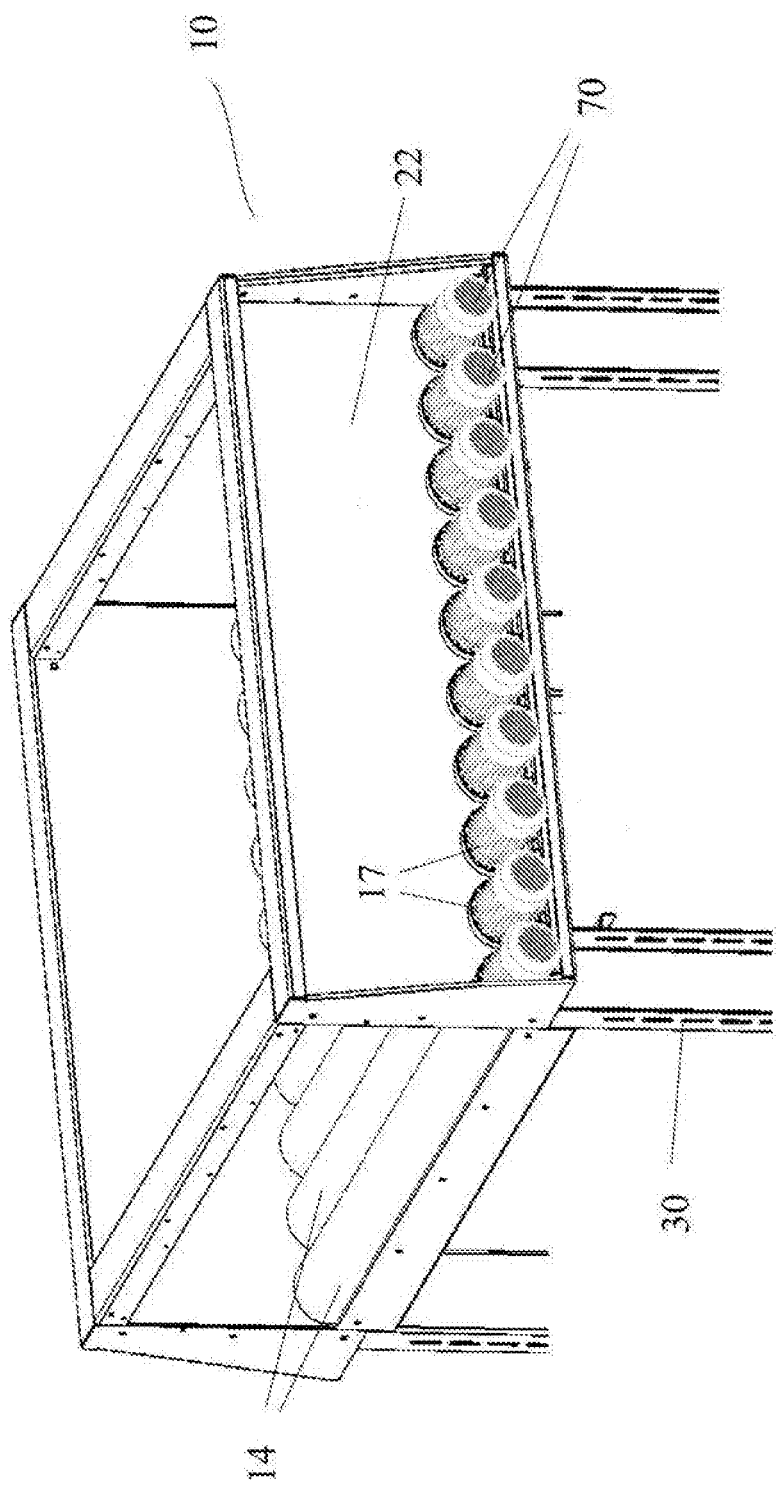
FIG. 13 is a perspective view of a conveyor system according to another embodiment of the present invention, in which the driving magnetic rotors are electromagnetic, wherein the supporting legs of the frame have been cropped to allow for a closer view.

In some embodiments, and without limitation, each of the magnetic driving rotors may be engaged with a separate motor. For example, each magnetic driving rotor may be connected to and driven by its own AC motor, a servo motor, etc. FIG. 13 shows an exemplary embodiment in which each magnetic driving rotor 17 is engaged with a separate motor 70 for driving the rotation of the magnetic driving rotor. The axle of each motor 70 may be directed connected or indirectly connected via a coupling device to one of the magnet driving rotors 17. The motors 70 may be in electronic communication with a controller. The controller may have analog or digital controls for turning the motors on or off, and/or to set a rate at which the magnetic driving rotors spin. In some examples, and without limitation, the controller may be in electronic communication with a computer or processing unit (e.g., a system having a microprocessor), which may positioned at or near the conveyor bed or may be remote and have a wired or wireless connection to the controller. Such a computer or processing unit may include software capable of directing the controller to signal the motors to drive rotation of the driving rotors at various speeds.

Figure 14:
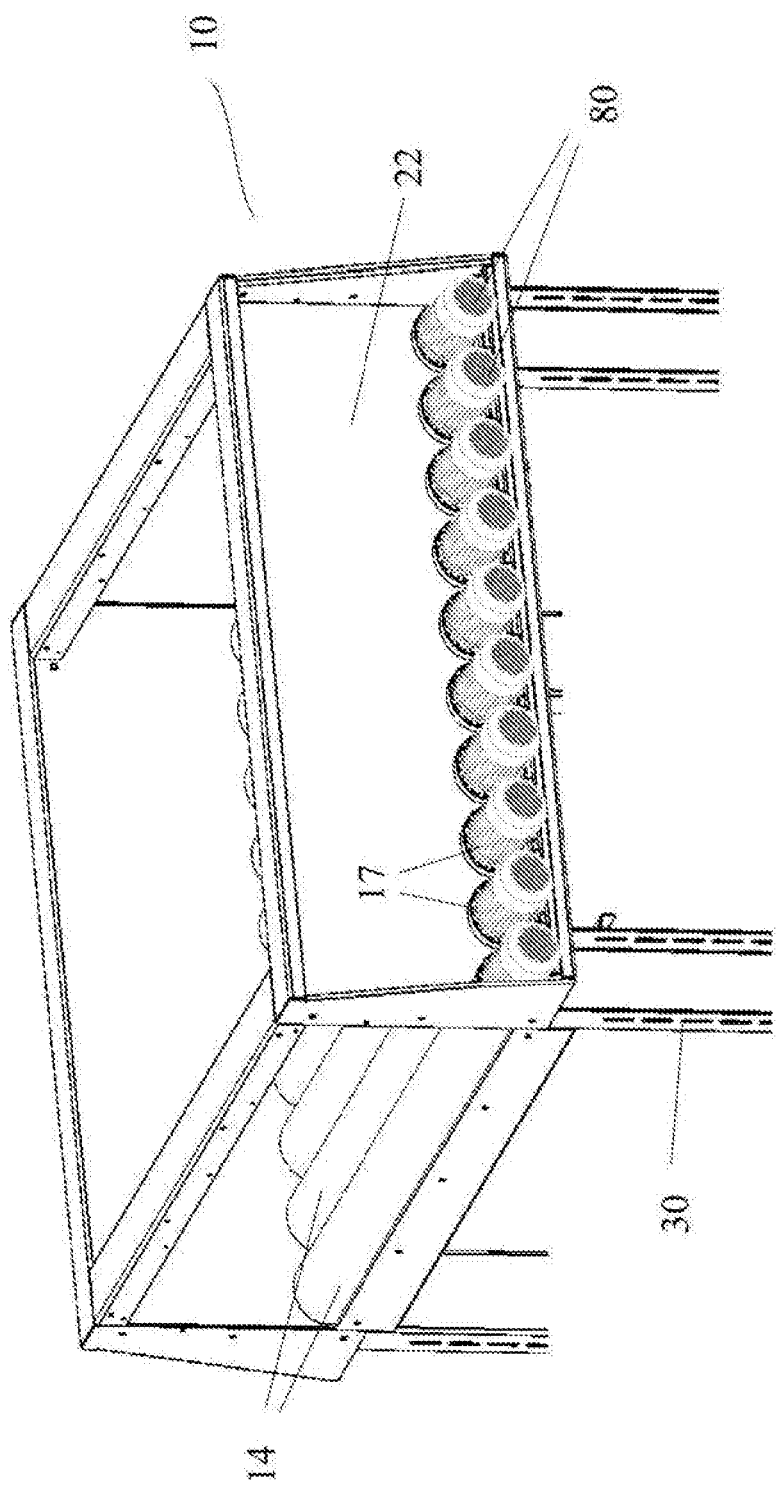
FIG. 14 is a perspective view of a conveyor system according to another embodiment of the present invention, in which the driving magnetic rotors are electromagnetic, wherein the supporting legs of the frame have been cropped to allow for a closer view.
Figure 15:
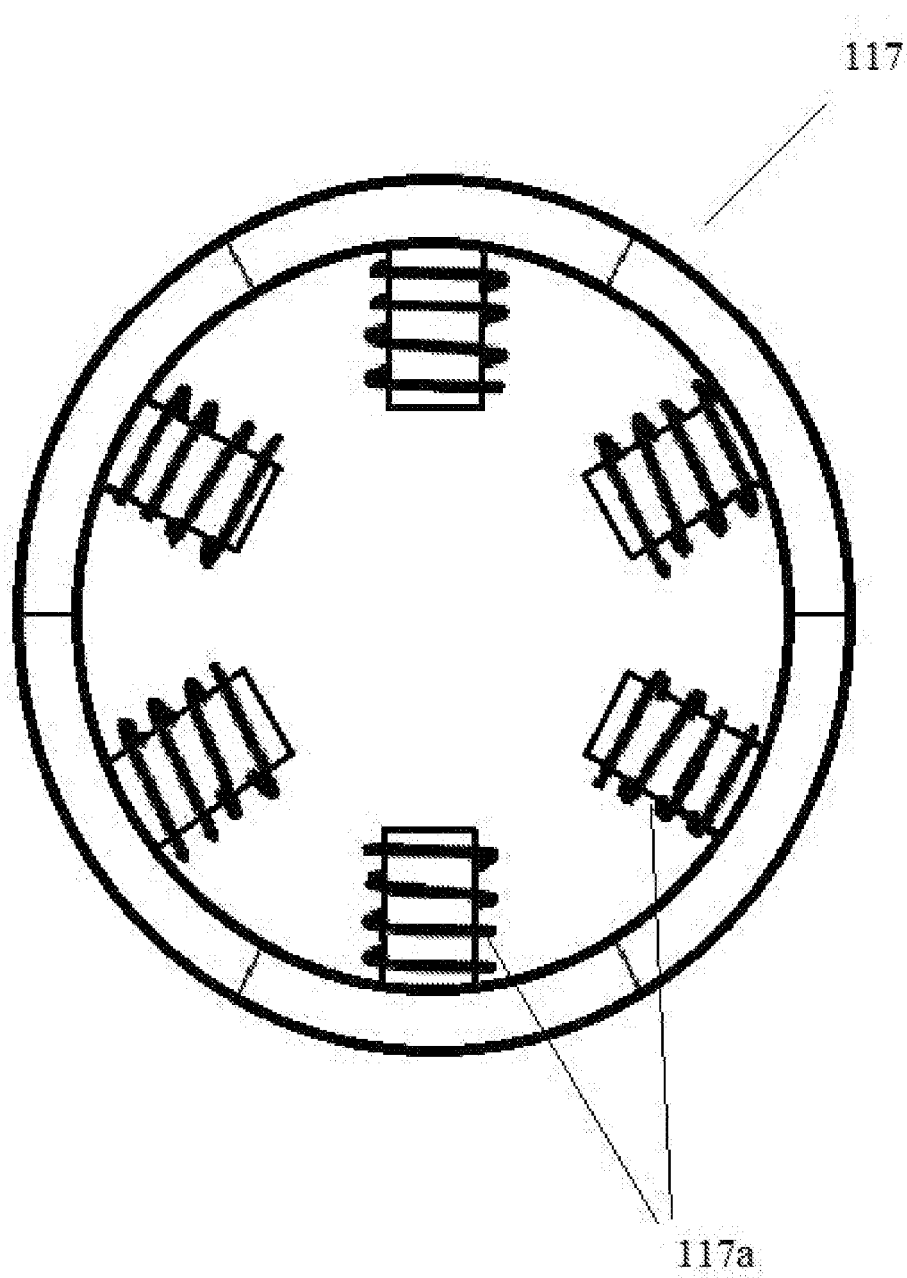
FIG. 15 is a frontal, close-up view of an electromagnetic driving rotor (stator) according to an embodiment of the present invention.

Without limitation, the driving system may incorporate electromagnets in some embodiments of the present invention. In some embodiments, and without limitation, rather than having a motor and a driving belt or chain, the magnets in the face of the driving magnetic rotor may be electromagnets connected to an electronic control circuit. In some examples, each of the driving magnetic rotors and the passive rotors may act together like a brushless DC motor, in which a control circuit may alternate the application of direct current to electromagnetic coils within the magnetic driving rotor (which is an electromagnetic stator in such embodiments) to generate a moving magnetic field that may rotate around the magnetic driving rotor as current is successively delivered in a coordinated manner from coil to coil. As an example, and without limitation, FIG. 14 shows an embodiment of the present invention that includes electric motors 80 that drive the rotation of the passive magnetic rotors by utilizing a circular arrangement of electromagnets as an electromagnetic stator. FIG. 15 shows an electromagnetic driving rotor 117 (really a stator), which may be located within each of the electric motors 80. The driving rotor 117 includes multiple coils 117a to which a controller may deliver current in a circulating pattern. For examples, the control circuit may first deliver current to the upper most coil and then switch the delivery of current in a clockwise direction from one coil to the next to create a circular movement of the magnetic field. This circular magnetic field may interact with one or more permanent magnets in the interfacing surface of the passive magnetic rotor, thereby causing the passive magnetic rotor to spin and cause the roller in which it is embedded to rotate. The speed at which the direct current is switched between coils in the electromagnetic driving rotor 117 determines the speed at which the passive magnetic rotor rotates. In other embodiments, and without limitation, the control circuit may deliver current to each coil simultaneously and the polarity of the magnets may be controlled such that adjacent magnets always have opposite polarities. Additionally, the passive magnetic rotor may have permanent magnets arranged in a pattern that corresponds (e.g., the magnets have the similar size and placement) to the pattern of electromagnets in the electromagnetic driving rotor, where the permanent magnets alternate in polarities such that adjacent magnets have opposite polarities. In such a design, the current delivered to each coils may be reversed back and forth (positive to negative and vice versa) in order to alternate the polarity of the electromagnet. The alternation of the polarity of the electromagnets may propel rotation of the passive rotor as the polarities of each of the electromagnets alternate in a coordinated pattern. The speed of the rotation of the passive magnetic rotor (and the roller) may be controlled by the frequency of the reversing current applied to the electromagnets.

In such embodiments and without limitation, the conveyor system may include a processing unit (e.g., an IC processor) that is in electronic communication with the control circuit and is operable to monitor and control the rotational speed of the magnetic driving rotors. The magnetic driving rotors may include sensors (e.g., Hall-effect sensors) therein that detect magnetic fields therein that are in electronic communication with the processing unit. One or more magnetic field sensors may be positioned between the coils. The sensors may detect the location of the magnetic poles of the permanent magnets on the passive magnetic rotor as the passive magnetic rotor rotates. Using the data provided by the magnetic field sensors, the processing unit may determine which coils to activate to optimize the spin of the passive magnetic rotors. The processing unit may also be programmed to maintain a predetermined rotational speed or vary the rotational speed according to a predetermined pattern. The predetermined rotational speed or varying speed pattern may be selected by the operator of the system from existing programming (e.g., from a set of predetermined selectable settings provided in firmware and/or software of the processing unit) or may be programmed and set by the operator using an operator interface operable to allow the operator to program rotational speeds and patterns of variable rotational speeds within a range of available rotational speeds.

Figure 16A:
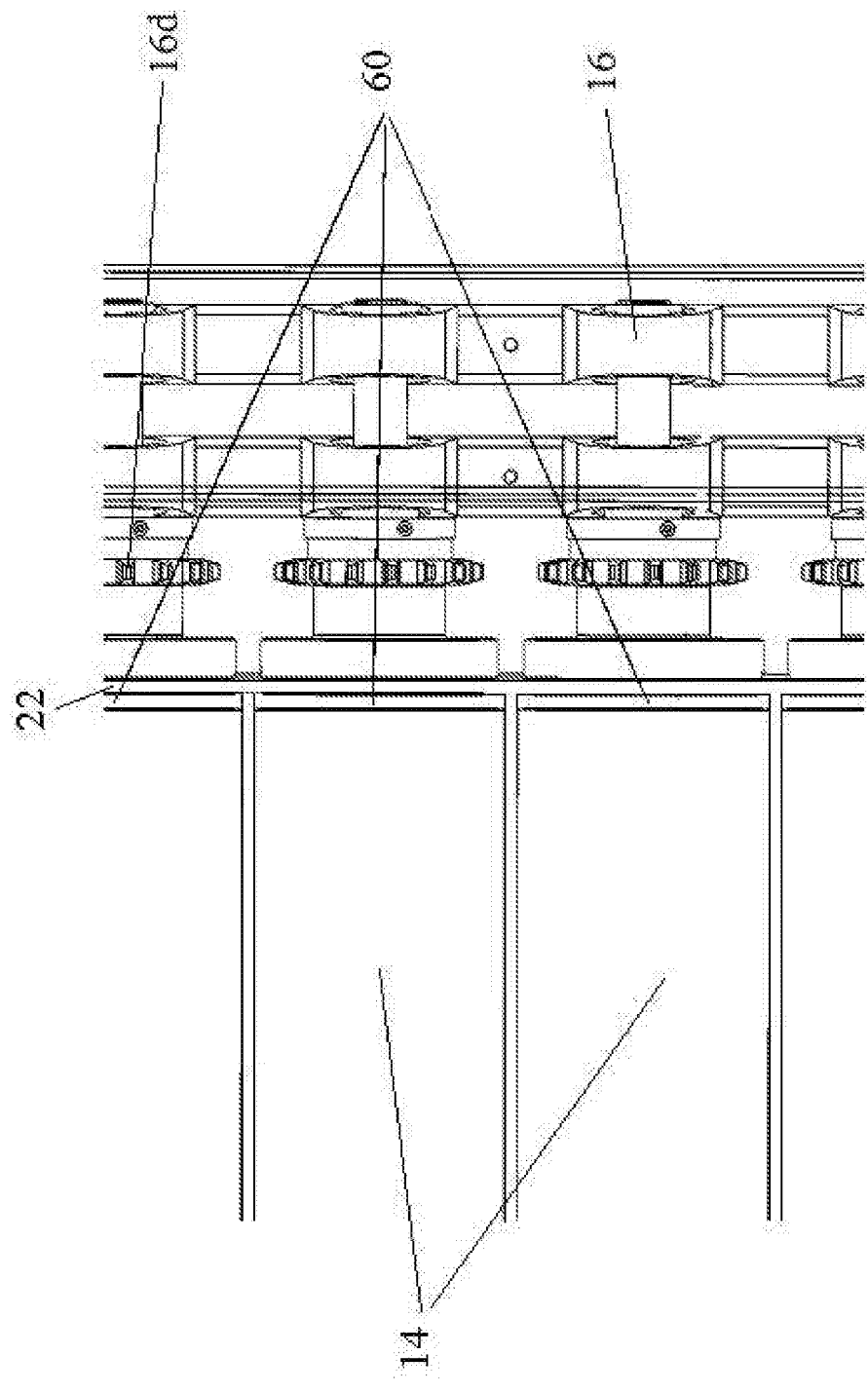
FIG. 16a is an overhead, close-up view of an arrangement of passive magnetic rotors and magnetic driving rotors, in which the passive magnetic rotors are suspended in the conveyor bed by magnetic attraction to the magnetic driving rotors. Certain structures have been cropped to allow for the close-up view.

The present invention is intended to reduce or eliminate the passage of materials from the interior of the conveyor bed to the exterior and vice versa. In some embodiments, and without limitation, the sidewall 22 may have no holes therein in order to prevent the passage of debris and contaminants from the conveyor bed to the area of the driving system and damage to the driving system components (e.g., the transmission assemblies, the driving chain or belt, the motor, etc.). In such implementations, the magnetic driving rotor may act to suspend and maintain the position of the corresponding passive magnetic rotor (and the roller) on the opposite side of the sidewall, such that no axle or pin is required to position the roller. Such an arrangement is shown in FIG. 16a. FIG. 16a, sidewall 22 is shown as transparent to demonstrate that there is no pin or rod for suspending the rollers 14 in position, and no recesses or holes in sidewall 22 for receiving such rods or pins. FIG. 16a also shows that rollers 14 may each include a gasket 60 that abuts the sidewall 22 to prevent or reduce the movement of debris from the interior of the conveyor bed into the area between the roller 14 and the sidewall 22.

Figure 16B:
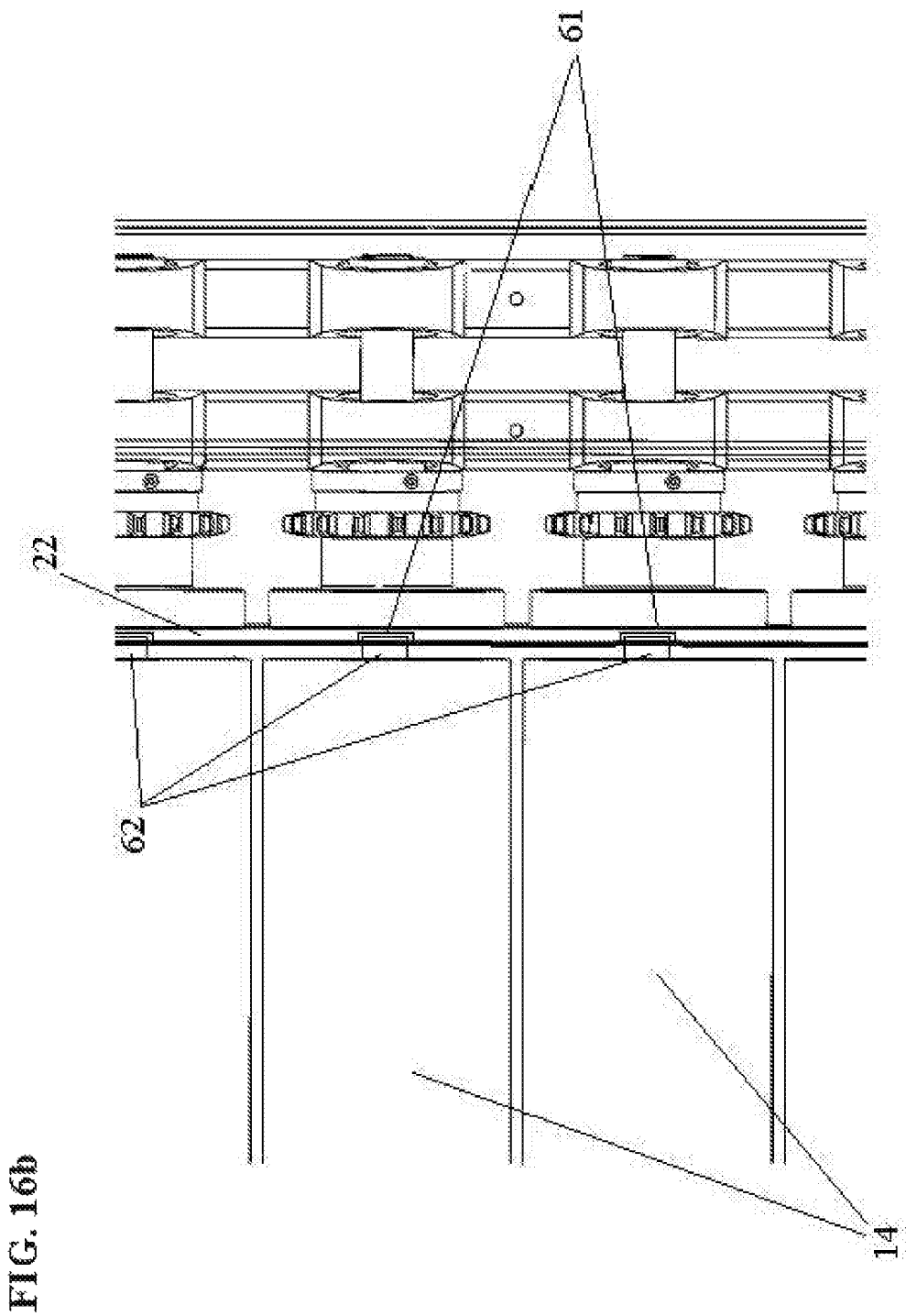
FIG. 16b is an overhead, close-up view of an arrangement of passive magnetic rotors and magnetic driving rotors, in which the passive magnetic rotors are suspended in the conveyor bed by an axial pin inserted into a recess in a sidewall of the conveyor bed. Certain structures have been cropped to allow for the close-up view.

In other embodiments, and without limitation, the sidewall may have a recess (that does not pass completely through sidewall) for receiving a pin or an axle of the roller. In such implementations, each recess may receive a pin or rod protruding from a roller, and aid in suspending the roller within the conveyor bed. As shown in FIG. 16b, the sidewall 22 (depicted as transparent) may have recesses 61 therein for receiving axial pins 62 from the rollers 14. The rollers 14, the axial pins 62, the recesses 61, and the magnetic driving rotors 17 may all be concentric, allowing for efficient rotation of the rollers. FIG. 16b does not show a gasket 60 that abuts the sidewall 22 in order to show the position of the axial pin 62. However, it should be noted that the embodiment may include the gasket 60 (see FIG. 16a for reference).

Figure 16C:
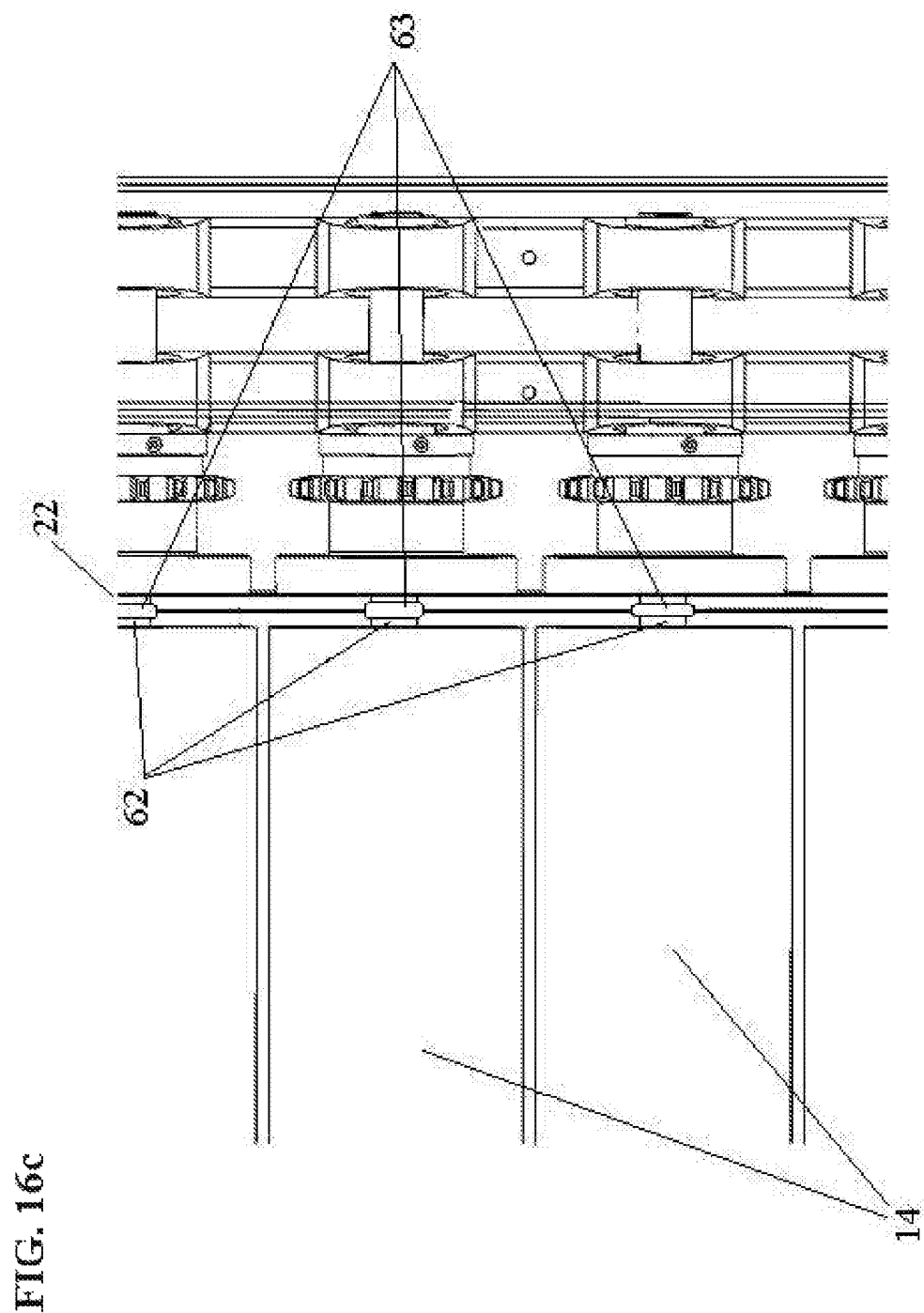
FIG. 16c is an overhead, close-up view of an arrangement of passive magnetic rotors and magnetic driving rotors, in which the passive magnetic rotors are suspended in the conveyor bed by an axial pin passing through a hole in a sidewall of the conveyor bed. Certain structures have been cropped to allow for the close-up view.

In still other embodiments, and without limitation, the sidewall may have a hole for receiving a pin or an axle of the roller. In such implementations, a grommet or gasket may encircle each hole and the pin therein to prevent the transfer of debris across the sidewall. As shown in FIG. 16c, the sidewall 22 (depicted as transparent) may have holes 63 therein to allow the passage of axial pin 62 through sidewall 22 so that they can engage with the magnetic driving rotors 17. The axial pin may aid in keeping the roller and/or the magnetic driving rotor in stable, predetermined position and maintain the proper alignment between the magnetic driving rotor and the passive magnetic rotor on the opposite side of the sidewall 22. FIG. 16c also shows grommets 63 that surround the axial pin at the holes in the sidewall 22. FIG. 16c does not show a gasket 60 that abuts the sidewall 22 in order to show the position of the axial pin 62. However, it should be noted that the embodiment may include the gasket 60 (see FIG. 16a for reference).

Figure 17:
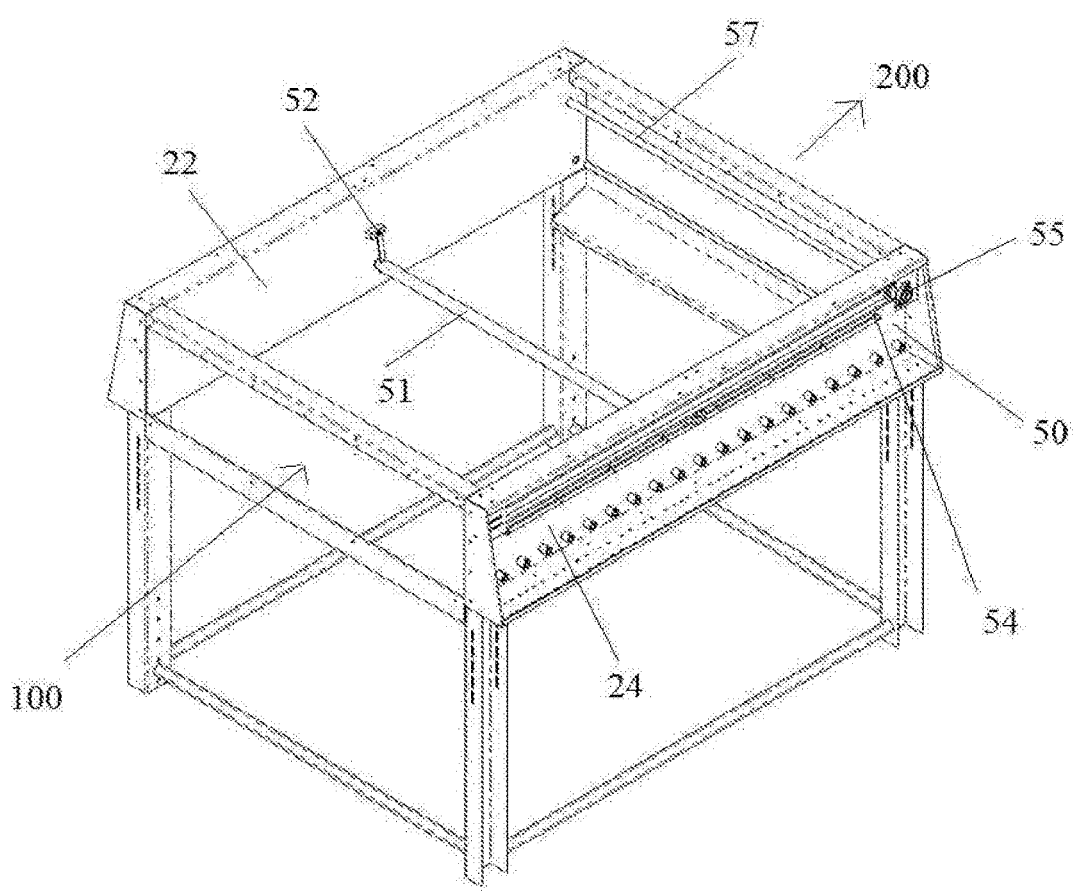
FIG. 17 is a perspective view of a conveyor system according to an embodiment of the present invention, in which a sweeping device is shown. Certain structures have been cropped to allow for a clearer view of the sweeping device and related structures.
Figure 18:
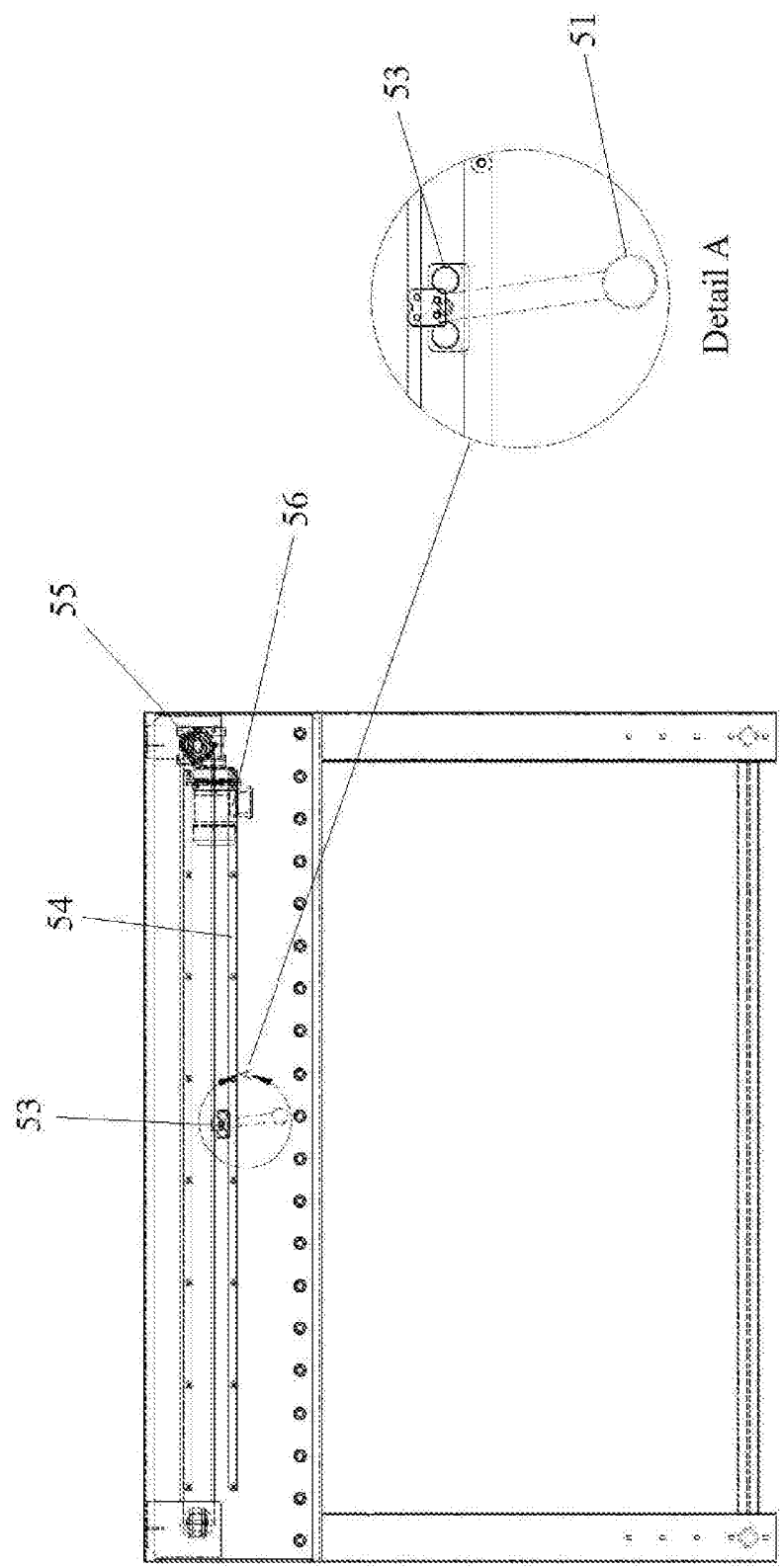
FIG. 18 is a side view of a conveyor system according to an embodiment of the present invention, in which a sweeping device is shown and the sidewall is shown as transparent to allow a view of the sweeping device. Certain structures have been cropped to allow for a clearer view of the sweeping device and related structures.

In some embodiments, and without limitation, the conveyor system of the present invention may also include a sweeping device or clean-out bar that may be used to periodically clear produce or other items from the conveyor bed. The sweeping device include a sweeping bar that can be passed closely over the rollers of the conveyor bed from the input end of the conveyor bed to the output end, drawing any produce or other items or materials off of the rollers and out of the conveyor bed. Like the rollers of the conveyor system, the sweeping device may be connected to an exterior driving mechanism by magnetic force. As an example, and without limitation, FIGS. 17-18 show a sweeping device system 50 for clearing produce or other items off of a conveyor bed. The conveyor bed and rollers are absent from FIG. 17-18 drawings for the sake of visual clarity. The sweeping device may include a driving system that may be on the exterior side of one or both of the sidewalls of the system and a sweeping arm that is connected to the driving system by magnetic force across the sidewall.

For example, and without limitation, FIGS. 17-18 show a sweeper driving system on an exterior side of sidewall 24 that includes a motor 55 that drives a sprocket 56, which is connected to a driving bar that drives a second sprocket 58 on an outer side of sidewall 22. The driving system includes two driving belts or chains 54 (sidewall 22 obscures the view of the second driving belt on the outer side thereof) that have magnetic couplers 53 attached thereto. As the motor 56 rotates the sprocket 55, the driving belts or chains rotate and move magnetic couplers 53 in an oblong path over the conveyor bed. The magnetic couplers 53 engage with magnetic couplers 52 across the sidewalls. A sweeping bar 51 is attached to the magnetic couplers 52 and is moved along the oblong path of the driving belts or chains as they rotate. The sweeping bar 51 is positioned such that it passes closely over the rollers in the conveyor bed for about half of its path. During the remaining portion of its path, the sweeping bar is inverted away from the conveyor bed and is passed back to the input end 100 of the conveyor system 10 so that it can make another pass over the conveyor bed. As the driving belt or chain is rotated on the sprocket, it may draw the sweeping bar along the conveyor bed and push produce or other items toward the output end 200 of the conveyor system. Other implementations and designs of the sweeping device are contemplated within the scope of the present invention.

In operation, produce or other items may be fed into the input end of the conveyor system by human operators or from another conveyor or processing system. The roller conveyor may propel the produce along the conveyor bed as the rollers rotate. The motor and driving system may be operated at different speeds to drive the rotation of the rollers at different rotational speeds for different operations. The conveyor system may include additional components that are necessary for particular operations. For example, the conveyor system may include one or more spray nozzles for spraying water, cleaning solutions, and/or wax over the produce that is loaded onto the conveyor bed. The produce or other items may travel along the conveyor bed to the output end of the conveyor where the produce or other items may be transferred to another processing device (e.g., another conveyor, a sorting or sizing table, etc.).

The present invention provides novel conveying systems that use magnetic coupling across a barrier between transmission assemblies of a driving system and rollers in a conveyor bed. The arrangement of the passive magnet rotors and the magnetic driving rotors allows for a gapless or nearly gapless roller bed that prevents or reduces the accumulation of debris and contaminants in the hardware of the conveyor system. The sanitary conveyors of the present invention may be advantageously used in produce processing and other applications with reduced cleaning and maintenance requirements, allowing for longer continuous operation times and higher efficiency.

It should be understood that the foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, and to thereby enable others skilled in the art to best utilize the invention and various embodiments with various modifications as are suited to the particular use contemplated.

What is claimed:

1. A conveying system assembly, comprising:
   a. a conveyor for moving items along a conveying path;
   b. at least one lateral sidewall positioned longitudinally along said conveyor, and
   c. a sweeping device operable to clear said items from said conveyor by moving along a length of said conveyor, said sweeping device being positioned on a first side of said at least one lateral sidewall and magnetically coupled to a driving mechanism positioned on a second side of said at least one lateral sidewall.

2. The assembly of claim 1, wherein said sweeping device comprises a bar operable to follow an oblong path, the entirety of said oblong path being above said conveying path.

3. The assembly of claim 2, wherein said sweeping device comprises a first magnet having a first polarity, and said driving mechanism comprises a second magnet having a second polarity, said second polarity being opposite of said first polarity.

4. The assembly of claim 3, wherein said first magnet and said second magnet each comprise a permanent magnet.

5. The assembly of claim 3, wherein said first magnet is coupled to said second magnet along an entire path of the sweeping device.

6. The assembly of claim 1, wherein said sweeping device is positioned inside said sidewall and said driving mechanism is positioned outside said sidewall.

7. The assembly of claim 1, wherein said at least one lateral sidewall comprises no openings through which said sweeping device is coupled to said driving mechanism.

8. The assembly of claim 1, further comprising at least one driving rotor located outside of said conveyor bed and adjacent to an outer side of said at least one lateral sidewall.

9. The assembly of claim 1, wherein said driving mechanism comprises a sweeping device motor.

10. The assembly of claim 9, wherein said sweeping device motor is connected to a sprocket, said sprocket being connected to a drive belt and being operable to drive a rotation of said drive belt.

11. The assembly of claim 10, wherein said drive belt is in mechanical communication with said second magnet, said first magnet is magnetically coupled to said second magnet, and said rotation of said drive belt is operable to draw said sweeping device along said conveyor bed.

12. The assembly of claim 9, wherein said sweeping device motor is connected to a sprocket, said sprocket being connected to a drive chain and being operable to drive a rotation of said drive chain.

13. A conveying system assembly, comprising:
a. a conveyor,
b. a first lateral sidewall positioned longitudinally along a first side of said conveyor and a second lateral sidewall positioned longitudinally along a second side of said conveyor,
c. a sweeping device operable to clear items off of said conveyor by moving along a length of said conveyor, said sweeping device being positioned between said first lateral sidewall and said second lateral sidewall, and
d. a driving mechanism magnetically coupled to said sweeping device across said first sidewall and said second sidewall.

14. The assembly of claim 13, wherein said sweeping device comprises a bar having a first inner magnetic coupler on a first end of said bar and a second inner magnetic coupler on a second end of said bar, said first inner magnetic coupler being magnetically coupled across said first lateral sidewall to a first outer magnetic coupler of said driving mechanism, and said second inner magnetic coupler being magnetically coupled across said second lateral sidewall to a second outer magnetic coupler of said driving mechanism.

15. The assembly of claim 14, wherein said driving mechanism comprises a sweeping device motor, a first sprocket positioned adjacent to said first lateral sidewall and operable to drive a first driving belt, a second sprocket positioned adjacent to said second lateral sidewall and operable to drive a second driving belt, and a driving bar mechanically connecting said first sprocket to said second sprocket.

16. The assembly of claim 15, wherein said first outer magnetic coupler is in mechanical communication with said first drive belt, and said second outer magnetic coupler is in mechanical communication with said second drive belt, such that said driving mechanism is operable to draw said bar along said conveyor.

17. The assembly of claim 13, wherein said first lateral sidewall comprises no holes through which said first inner magnetic coupler is coupled to said first outer magnetic coupler, and said second lateral sidewall comprises no holes through which said second inner magnetic coupler is coupled to said second outer magnetic coupler.

18. A method of clearing items or materials from a conveyor, comprising:
a. connecting a magnetic driver to a passive magnetic coupler across a sidewall, wherein said sidewall is positioned along a conveyor and said passive magnetic coupler is mechanically connected to a sweeper positioned over said conveyor; and
b. moving said magnetic driver along a first side of said conveyor to drive the movement of said passive magnetic coupler and said sweeper over said conveyor to draw items or materials along said conveyor.

19. The method of claim 18, wherein there is no mechanical connection between said magnetic driver and said passive magnetic coupler.

20. The assembly of claim 18, wherein a driving mechanism moves said magnetic driver along a path on said first side of said sidewall.

* * * * *